United States Patent [19]
Carter et al.

[11] Patent Number: 6,002,873
[45] Date of Patent: *Dec. 14, 1999

[54] COMPILER-ASSISTED OR INTERPRETER-ASSISTED WINDOWING SOLUTION TO THE YEAR 2000 PROBLEM FOR COMPUTER PROGRAMS

[75] Inventors: William Augustus Carter, Georgetown, Ky.; Alan Roeder Elderon, Mountain View, Calif.; Timothy David Magee, Lexington; Mark David Nicholas, Georgetown, both of Ky.; Henry Y. Saade, San Jose, Calif.; Grant Sutherland, Cottesloe, Australia; William Nicholas John Tindall, San Martin, Calif.; Jeffrey Ramesh Urs, Nicholasville; Timothy Edward Weinmann, Lexington, both of Ky.; Michael Thomas Wheatley, San Jose, Calif.

[73] Assignee: International Business Machines Corporation, Armonk, N.Y.

[*] Notice: This patent is subject to a terminal disclaimer.

[21] Appl. No.: 08/971,119

[22] Filed: Nov. 14, 1997

Related U.S. Application Data

[63] Continuation-in-part of application No. 08/899,444, Jul. 23, 1997.

[51] Int. Cl.⁶ ..................................................... G06F 9/45
[52] U.S. Cl. ......................... 395/705; 395/708; 707/101
[58] Field of Search ................................... 395/705, 708; 707/6, 101

[56] References Cited

U.S. PATENT DOCUMENTS

| | | | |
|---|---|---|---|
| 5,600,836 | 2/1997 | Alter | 707/101 |
| 5,630,118 | 5/1997 | Shaughnessy | 707/1 |
| 5,644,762 | 7/1997 | Soeder | 707/6 |
| 5,668,989 | 9/1997 | Mao | 707/101 |

(List continued on next page.)

FOREIGN PATENT DOCUMENTS

| | | |
|---|---|---|
| 9151894 | 3/1991 | Japan . |
| 91177982 | 7/1991 | Japan . |
| 8006925 | 1/1996 | Japan . |

OTHER PUBLICATIONS

Pietrucha, B.; "White Paper Eyes Dynamic Centuries as Year 2000 Fix"; Newsbytes. NLDB [online]: Newsbytes News Network [retrieved on 1999–07–14]. Retrieved from STN International. Accession No. 97:225491 Jun., 1997.

Lefkon, D.; "Seven Work Plans for Year–2000 Upgrade Projects"; Communications of the ACM; vol. 40, No. 5, pp. 111–113, May 1997.

(List continued on next page.)

*Primary Examiner*—Tariq R. Hafiz
*Assistant Examiner*—Brian Sattizahn
*Attorney, Agent, or Firm*—Pretty, Schroeder & Poplawski, P.C.

[57] ABSTRACT

A method, apparatus, and article for solving the year 2000 problem involves limited modifications in the data definition portions of the source code and compiler support for processing the modified source code. Fields in the source code that contain a year or date values are identified and, for each such field, the user selects an appropriate technique (for example, expansion, compression or windowing). The user modifies the data definition for each identified field, by adding new attributes to request the selected technique. The user then compiles the program and resolves any ambiguous references to the variables whose definitions were modified. This procedure is applied, module by module, and each processed module is merged into production, after testing, by using a compiler option to disable the use of the new attributes. A compiler option provides for the generation of debugger hooks for each statement that has been affected by modified declarations, which may be used with a suitably equipped debugger or other run-time analysis tool.

7 Claims, 2 Drawing Sheets

U.S. PATENT DOCUMENTS

| | | | |
|---|---|---|---|
| 5,742,828 | 4/1998 | Canady et al. | 395/708 |
| 5,758,336 | 5/1998 | Brady | 707/6 |
| 5,758,346 | 5/1998 | Baird | 707/101 |
| 5,794,048 | 8/1998 | Brady | 395/705 |
| 5,808,889 | 9/1998 | Burgess | 364/737 |
| 5,809,500 | 9/1998 | Nolan | 707/6 |
| 5,838,979 | 11/1998 | Hart et al. | 395/707 |
| 5,852,824 | 12/1998 | Brown | 707/6 |
| 5,878,422 | 3/1999 | Roth et al. | 707/100 |
| 5,907,710 | 5/1999 | Furukawa et al. | 395/708 |
| 5,915,116 | 6/1999 | Hochman et al. | 395/705 |

OTHER PUBLICATIONS

Newcomb, P.; Scott, M.; "Requirements for Advanced Year 2000 Maintenance Tools"; Computer; IEEE Computer Society; pp. 52–57, Mar. 1997.

Zvegintzov, N.; "A Resource Guide to Year 2000 Tools"; Computer; IEEE Computer Society; pp. 58–63, Mar. 1997.

Martin, R.; "Dealing with Dates: Solutions for the Year 2000"; Computer; IEEE Computer Society; pp. 44–51, Mar. 1997.

Hart, J., Pizzarello, A., "A Scaleable, Automated Process for Year 2000 System Correction", Proceedings of the 18th International Conference on Software Engineering, pp. 475–484, 1996.

"The Year 2000 and 2–Digit Dates: A Guide for Planning and Implementation", IBM Corporation, pp. 4–1–4–13, May 1996.

RD 265052 May 1986 Research Disclosure.

MatriDigm™ Corporation News Release "MatriDigm™ Announces Key Patent Filings," Oct. 29, 1996.

Millennium Dynamics, Inc., "Summary of Products and Services" (undated).

Brochure: "Micro Focus Challenge 2000" (undated).

"Automated Year 2000 Conversion of COBOL Prorams" by Dr. Emma Teodoro, President, STA Inx. (undated).

STA America brochure, "FIELDEX: The Indispensable Time & Money Saving Software Tool For Century Change Projects".

Data Integrity, Inc. "Solutions for year 2000 computing problems" (undated).

Edge Information Group, "Guide International Survey of Year 2000 Tools" Apr. 1997.

DIALOG Search result: Cayenne Software's Cayenne 2000 and Intersolv's "Manage2000" Dec. 1996.

DIALOG search result: "Seec Inc. of US Launches Year 2000 Software In India" Oct. 29, 1996.

DIALOG search result: "DB–Net moves into the new millenium" Jul. 1996.

DIALOG search result: "The millennium mess (Year 2000 conversion project)" from *Industry Trend or Event*, Jan. 1996.

DIALOG search result: "Countdown To The Year 2000—Object–oriented Cobol may help solve the legacy problem that programmers will face in the coming millennium," by Edmund C. Arranga, *Informationweek*, Jul. 15, 1996.

DIALOG search result: "Technology Overview—Solving The Year 2000 Problem—Various products and services can help you plan and manage the project" by Lawrence Meador, *Informationweek*, Feb. 5, 1996.

DIALOG search result: "Everybody knows about the year 2000 problem, but The Equitable decided to . . . " byline Robert L. Scheier, *Computerworld*, Mar. 25, 1996.

DIALOG search result: "Year 2000 Software Solution Patent Application Filed by International Veronex Resources" *Newswire*, filed by International Veronex Resources, Aug. 13, 1997.

DIALOG search result: "B–Tree Systems (TM) Inc. Answers Year 2000 Problem for Embedded Applications," *Newswire*, Aug. 11, 1997.

DIALOG search result: "MCI Systemhouse Aligns With INTERSOLV to Extend Comprehensive Year 2000 Solutions for Buisness," *Newswire*, Aug. 4, 1997.

DIALOG search result: "EDS Offers solutions to Y2K conversion," *PC Week*, Jul. 21, 1997.

DIALOG search result: "Reasoning partners with EDS to provide comprehensive Year 2000 solutions and services; Reasoning expands global alliances and delivers second–comp–generation Year 2000 solutions for EDS' growing Year 2000 business" *Business Wire* Jun. 23, 1997.

DIALOG search result: Article "Tool Vendors Search For Ways To East Year–2000 Solutions At Software Productivity Group Year–2000 Conference," *InfoWorld*, Jun. 30, 1997.

DIALOG search result: "CA Announces CA–FIX/2000 To Provide Automated Remediation Of COBOL Applications For New Millenium," *Business Wire*, Jun. 23, 1997.

DIALOG search result: "Computer Horizons Now Offers Licenses Independent of Services for Signautre 2000 Software Toolset," *Business Wire*, Jun. 26, 1997.

DIALOG search result: NeoMedia Adds Year 2000 Tools for IBM VSE Market, *Business Wire*, Jun. 13, 1997.

DIALOG search result: "NeoMedia Opens European Office to Market Year 2000 Legacy Products," *Business Wire*, Jun. 30, 1997.

Article: "Management Issues For Year 2000 System Conversions," Gary M. Ross, *Enterprise Systems Journal*, Apr. 1997.

Article: "Year 2000 Analysis: Gaining Maximum Value From The Process," Fred Schuff, *Enterprise Systems Journal*, Mar. 1997.

COMPILER-ASSISTED OR INTERPRETER-ASSISTED WINDOWING SOLUTION TO THE YEAR 2000 PROBLEM FOR COMPUTER PROGRAMS

RELATED APPLICATIONS

This invention is a Continuation In Part of copending application Ser. No. 08/899,444, filed Jul. 23, 1997, and the contents of this application is incorporated by reference herein.

BACKGROUND OF THE INVENTION

1. Field of the Invention

The present invention relates generally to computer-implemented compilers or interpreters for high-level programming languages and their associated run-time environments, and in preferred embodiments, to a computer-implemented method, apparatus, and article of manufacture for solving the Year 2000 problem using a compiler or interpreter.

2. Description of the Related Art

Computer systems used in various processing applications, such as, for example, processing insurance information, account information, inventory information, investment information, retirement information, as well as many other applications, often operate with records and data containing date-dependent information. In many computing systems, date information relating to years has typically been represented in two-digit year formats, where two digits represent a year between 1900 and 1999. Thus, for example, the two digits "97" would represent the year 1997. Popular usage of this simplified date information format throughout the computer industry has resulted in an industry-recognized problem, often referred to as "the year 2000 problem."

More specifically, as a result of this simplification of date information, upon the turn of the century (i.e., upon the year 2000), two-digit year information intended to represent a year within the 21st century will, instead, be indistinguishable by computer systems from a year within the 20th century (i.e., between 1900 and 1999). Thus, for example, a two-digit year value of "08" which is intended to represent the year 2008 will be indistinguishable from the year 1908 by such computer systems.

Various solutions to the "year 2000 problem" have been suggested. However, previously proposed manners of implementing such solutions have been tedious, expensive and error-prone, rendering such implementations economically impractical in many contexts.

For example, three widely recognized techniques to address the year 2000 problem are: expansion, windowing, and compression. The expansion technique, in general, involves a conversion of 2-digit years to 4-digit years. This solves the problem of ambiguity. However, because the size of the field is larger after expansion, prior proposals to implement this technique have required modifications to application logic, data files, and databases, etc. (including backup copies). In addition, processing routines involving date information would have to be rewritten to accommodate four-digit year data. The costs and conversion time associated with such modifications can eliminate this as a practical option.

According to the windowing technique, a 2-digit year field is interpreted as a year within a 100 year window of time. In the past, the year values, ranging from 0 to 99, were interpreted within the 100 year window of 1900 to 1999. The windowing technique simply allows the programmer to specify a window with a set of values different than from 1900 to 1999, for example, from 1960 to 2059. In the simple form of this technique, a single window is used for all windowed items in the executable module.

In addition to this "single" window technique, multiple windows may be supported by allowing different window values to be defined for each program variable in the source module. For example, values representing birth dates ranging from 1920 to the present may coexist in a module with values representing retirement dates ranging from 1960 to 2059. Multiple windows provide a significant additional capability in terms of flexibility and power.

This fixed windowing technique can be extended to a "sliding" window concept. In this implementation, the window is defined as an offset from the current year. For example, an item could be defined as windowed from 30 years prior to the current year to 69 years after the current year so that in 1997 the window would be from 1967 to 2066. Another windowing technique involves a "variable window" which may be changed each time a program is run, rather than fixed when the program is compiled. Windowing does not require changes to date data in databases and in other recorded media. However, prior windowing proposals required changes to program logic (typically in source programs) which, in the past, was accomplished by modifying each instance in a source code in which date information is used. Tools, such as Vantage YR2000™ from Millennium Dynamics, FIELDEX™ from STA America and 2000-Resolve™ from Micro Focus, have been developed to help analyze and modify source code statements. However, such source code modifications tend to increase the complexity of the source code, make debugging operations more difficult and, in some cases, increase the propensity for errors.

According to compression techniques, values greater than 99 are stored in the same space previously used to store two-digit year values. One previous manner proposed for implementing this function involved changing the datatype, for example, from character to binary, thus allowing values as large as 32,767 in the same two-byte field. However, such prior proposals require changing all recorded data to the new datatype, as well as changing program data declarations and, in some cases, program logic. Procedures for effecting such changes can be relatively complex, time consuming and error prone.

Therefore, although techniques have been developed for addressing the year 2000 problem, there is still a need in the art for a method which allows the problem to be addressed in an economical and practical manner.

As discussed in more detail below, embodiments of the present invention relate to a manner of addressing the year 2000 problem, using a compiler. A compiler is a computer program that translates a source program into an equivalent object program. The source language is typically a high-level language like COBOL, PL/I, C++, and the object language is the assembly language or machine language of some computer. The translation of the source program into the object program occurs at compile time; the actual execution of the object program occurs at run-time.

A compiler must perform an analysis of the source program and then it must perform a synthesis of the object program, wherein it first decomposes the source program into its basic parts, and then builds the equivalent object program parts from the source program parts. As a source program is analyzed, information is obtained from declarations and procedural statements, such as loops and file I/O statements.

Compilers for the COBOL, PL/I, and C++ programming languages are well known in the art. In addition, run-time environments for COBOL, PL/I, or C++ based computer programs are also well known in the art.

Further embodiments of the present invention relate to a manner of addressing the year 2000 problem, using an interpreter, as opposed to a compiler. An interpreter is a program that interprets source code and, with the computer, performs computations directly, as opposed to a compiler that processes the source code and turns it into object or compiled code, that in turn performs computations when it is subsequently executed.

SUMMARY OF THE DISCLOSURE

The present invention relates generally to a method, apparatus, and article of manufacture for solving the year 2000 problem using a compiler or interpreter, and computer systems employing the same.

It is an object of preferred embodiments of the present invention to provide such a method, apparatus, and article of manufacture, in which required modifications to the source code are minimized.

It is an object of further preferred embodiments to provide such a method, apparatus and article, which may utilize windowing, field expansion and compression techniques.

It is an object of yet further preferred embodiments to allow a flexible and comprehensive mixing of windowing, expansion and compression techniques within a program.

It is an object of yet further preferred embodiments to ease the implementation of the windowing, expansion and compression techniques by limiting, in the majority of cases, the modifications required in the source code to only modifications of data definition statements. These data definitions, suitably modified, make it possible in yet further preferred embodiments, for the compiler to generate the desired code, in most situations, and to flag ambiguous statements where they occur. In further preferred embodiments, the compiler flags every statement that has been affected by the modified definitions, to provide the programmer with additional information on the resulting changes and the ability to insert other directives, functions, or code modifications, if desired.

In yet further preferred embodiments, similar functions are performed by an interpreter that interprets the source code (or a tokenized form of the source code) and performs the computations requested by the source code modifications directly, as opposed to generating an object code that in turn performs the requested computations when it is subsequently executed.

It is an object of yet further preferred embodiments to provide a run-time analysis capability that can be used, in conjunction with a debugger or other run-time analysis tool, to track the actual run-time usage of data items whose definition has been modified to address the year 2000 problem. This analysis could be used to identify usage patterns, masks, etc. which may not be obvious from static analysis techniques.

It is an object of yet further embodiments to minimize the testing impact by minimizing user changes to program logic.

It is an object of yet further embodiments to provide the capability to convert existing code to be year 2000 capable, while, at the same time, maintaining and enhancing this code for normal day-to-day operations.

It is an object of yet further embodiments to provide a "disable" option, so that required changes can be made piecemeal, and disabled, so that the code may execute as it had prior to the conversion process, until conversion and testing is completed.

It is an object of yet further embodiments to provide a size error option, for handling events that involve storing year or date data that is larger than or otherwise incompatible with the field allotted for the data.

It is an object of yet further embodiments to provide an enhanced compiler or interpreter with a set of intrinsic functions (COBOL) or built-in functions (PL/I) which may be used by a programmer to resolve ambiguous statements or operate the program in a prescribed manner.

These and other objects are accomplished according to preferred embodiments, wherein a method, apparatus, and article of manufacture for solving the year 2000 problem involves limited source code modifications in the data definition portions of the code and compiler or interpreter support for processing the modified source code.

Minimizing the source code modifications to, primarily, data definitions statements (or declarations) can significantly reduce the cost, conversion time and error rate typically associated with the implementation of a year 2000 solution. Indeed, such limited source code modifications may be made with the aid of conventional analysis tools to identify fields in the source code that contain a year value. For each of these fields, the programmer selects an appropriate technique (for example, expansion or windowing). The data definition for each identified field is then modified, by adding new attributes to request the selected technique. The program is then compiled (or interpreted), using a set of desired compiler (or interpreter) options, and any ambiguous references to the variables whose definitions were modified in the previous step are identified and/or flagged.

In preferred embodiments, this process is applied on a module by module basis and each processed module is merged into production, after minimal testing, by using a compiler (or interpreter) option to disable the use of the new attributes.

In yet further preferred embodiments, additional run-time analysis may be conducted to validate the decisions and identify possible run-time conflicts. Thus, according to such preferred embodiments, a compiler (or interpreter) option provides for the generation of debug hooks for each statement that has been affected by the modifications to the data definition statements, thus allowing use of a debugger or other analysis tool at run-time to assist with run-time analysis and validation of the application.

In yet further preferred embodiments, a compiler (or interpreter) option allows the user to selectively enable or disable the new attributes, to test the modified program while disabling the new attributes, or to compile (or process with an interpreter) and test any executable with full Year 2000 support by enabling the use of the new attributes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which are shown, by way of illustration, several embodiments of the present invention. It is understood that other embodiments may be utilized and structural changes may be made without departing from the scope of the present invention.

OVERVIEW

The present invention relates to a method, apparatus, and article of manufacture for solving the year 2000 problem in computer programs using, in preferred embodiments, compiler directives and options, decorated data definition statements, a set of intrinsic functions and a set of compiler and run-time library enhancements.

HARDWARE ENVIRONMENT

Figure 1:
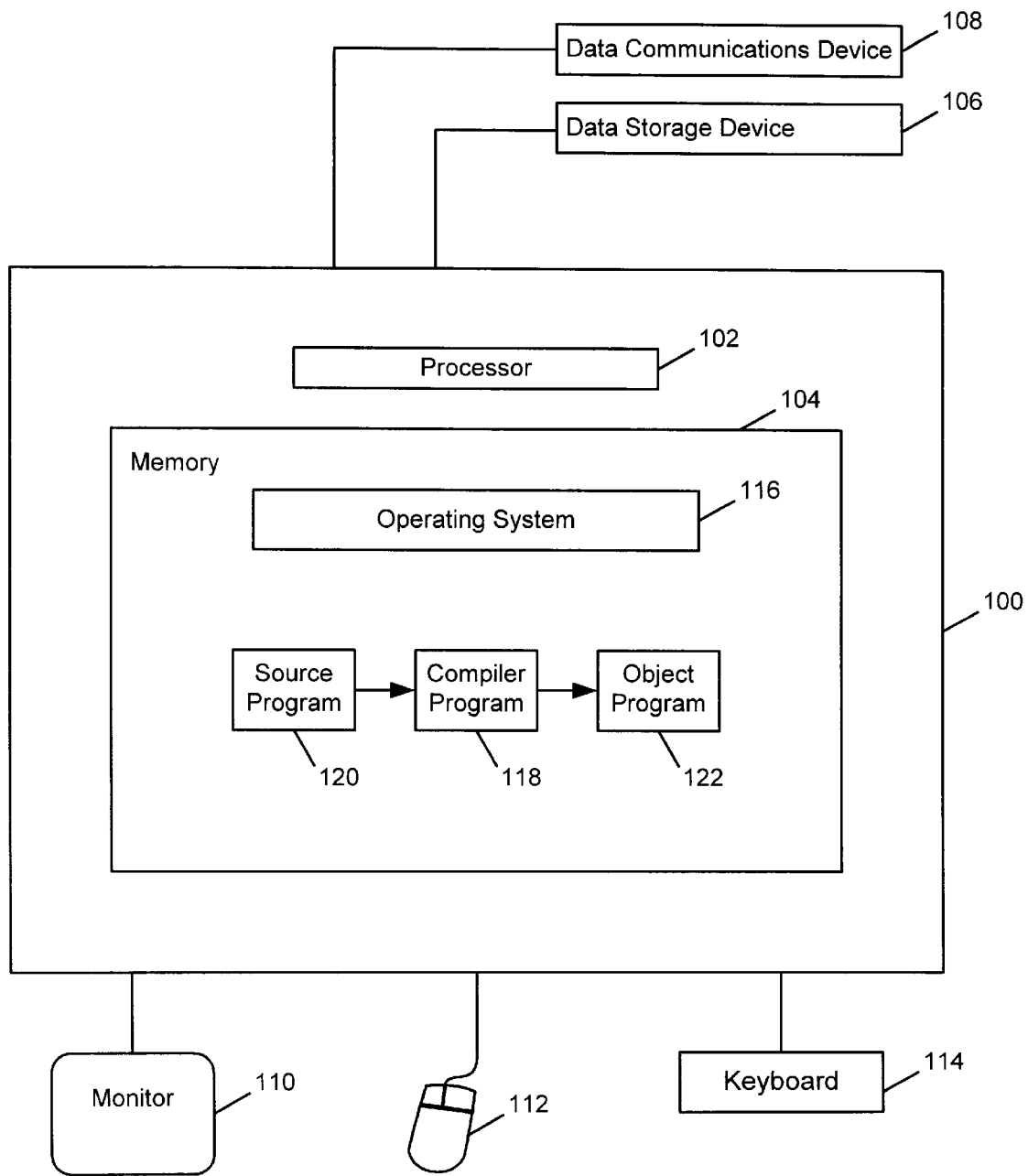
FIG. 1 is an exemplary hardware environment used to implement the preferred embodiment of the invention.

FIG. 1 is an exemplary hardware environment used to implement preferred embodiments of the invention. Embodiments of the present invention may be implemented using a computer, which generally includes, inter alia, a processor, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that, attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116, such as OS/2™, Windows95™, AIX™, UNIX™, DOS™, MVS™ etc. A preferred embodiment of the present invention is generally implemented using a compiler program 118 executed under the control of the operating system 116. In the preferred embodiment, the compiler 118 conforms to ANSI COBOL or PL/I language conventions, although those skilled in the art will recognize that the compiler 118 could also conform to other language conventions without departing from the scope of the present invention.

The compiler 118 performs an analysis of a source program 120 containing source code in the form of source language statements, wherein the source program 120 is generally stored in a text file on one or more of the data storage devices 106 or is read from one or more of the data communications devices 108 or is entered interactively by a programmer from the keyboard 114. The compiler 120 then synthesizes an object program 122 from the source language statements in the source program 120.

In yet further preferred embodiments, an interpreter is employed instead of a compiler, wherein the interpreter interprets the source code (or a tokenized form of the source code) and performs the computations requested in the source code and modified source code statements directly, as opposed to generating an object code that in turn performs the requested computations when it is subsequently executed.

As discussed in more detail below, according to preferred embodiments of the present invention, a programmer (or user) may use extensions built into standard language conventions to enter source language statements into the source program 120 that specify a solution to the year 2000 problem. In preferred embodiments, these source language extensions comprise extensions or modifications to certain data definition statements existing in the source program 120. These source language extensions, when recognized by the compiler 120, result in the generation of an object program 122 containing instructions for performing data comparisons and computations in a manner that avoids the year 2000 problem.

As described above, the source code may be processed in accordance with further preferred embodiments of the invention, by an interpreter, as opposed to a compiler. Such further embodiments preferably function similar to compiler embodiments, except that an interpreter performs computations requested in the source code directly, rather than first converting the source code into object or compiled code that performs the requested computations when it is subsequently executed. However, for purposes of simplifying the present disclosure, embodiments are described herein primarily with reference to compiler-based systems. One skilled in the art will understand that, where appropriate, the descriptions herein relating to compiler systems, compiler options and compiler functions and operations are applicable to interpreter systems, options, functions and operations as well.

Generally, the operating system 116, compiler 118, source program 120, and object program 122, which contribute to the implementation of the preferred embodiment of the invention, are embodied in, or readable from, a computer-readable medium or carrier, e.g., one or more of the fixed and/or removable data storage data devices 106 and/or data communications devices 108 connected to the computer 100. Under control of operating system 116, the compiler 118, source program 120, and object program 122 may be loaded from the data storage devices 106 or data communications devices 108 into the memory 104 of computer 100. Further, the operating system 116, compiler 118, and object program 122 comprise instructions which, when read and executed by computer 100, cause the computer 100 to perform the steps necessary to execute the steps or elements of the present invention.

According to preferred embodiments of the present invention, certain data declaration statements for year data and date data fields in the source program 120 are configured to include extensions requesting a particular year 2000 solution technique. In addition, the compiler 118 is configured to process year values in date fields of the source code, in accordance with the technique requested by the extensions to the declaration statements. More specifically, the compiler 118 is configured to recognize such extensions to a declaration and generate an object program 122 containing instructions for performing operations on the data fields associated with the declaration, in the manner that employs the requested technique for avoiding the year 2000 problem. Thus, preferred embodiments involve both compiler configurations and source code configurations, either or both of which are preferably achieved by minimal modifications to existing source programs and compilers.

Those skilled in the art will recognize that the exemplary environment illustrated in FIG. 1 is not intended to limit the present invention. Indeed, those skilled in the art will recognize that other alternative hardware environments may be used without departing from the scope of the present invention.

SOURCE PROGRAM ENHANCEMENTS

As noted above, embodiments of the present invention involve source code extensions to declaration statements which may be written as part of an original source program. However, in preferred embodiments, the source code configurations employed with the present invention involve minimal modifications to existing source programs made, for example, by a programmer, preferably using standard analysis and editing tools.

More specifically, certain data declaration statements in the source code are modified, using standard language conventions, to add extensions which specify a selected solution to the year 2000 problem. The selected solution may be, for example, any of the above-discussed windowing, compression or expansion techniques. However, other suitable techniques may be similarly specified. In preferred embodiments, no further modifications to the source code, and no modifications to the application logic or data files are typically necessary. Limiting the programmer-required modifications to, primarily, data definitions statements (or declarations) in the source code can minimize the complexity, cost, conversion time and error rate associated with the implementation of a year 2000 solution. Indeed, such limited source code modifications may be made with the aid of conventional analysis tools. In addition, the use of data definition statements renders it possible for the compiler to readily generate the desired code in most situations and flag ambiguous statements when they occur.

Figure 2:
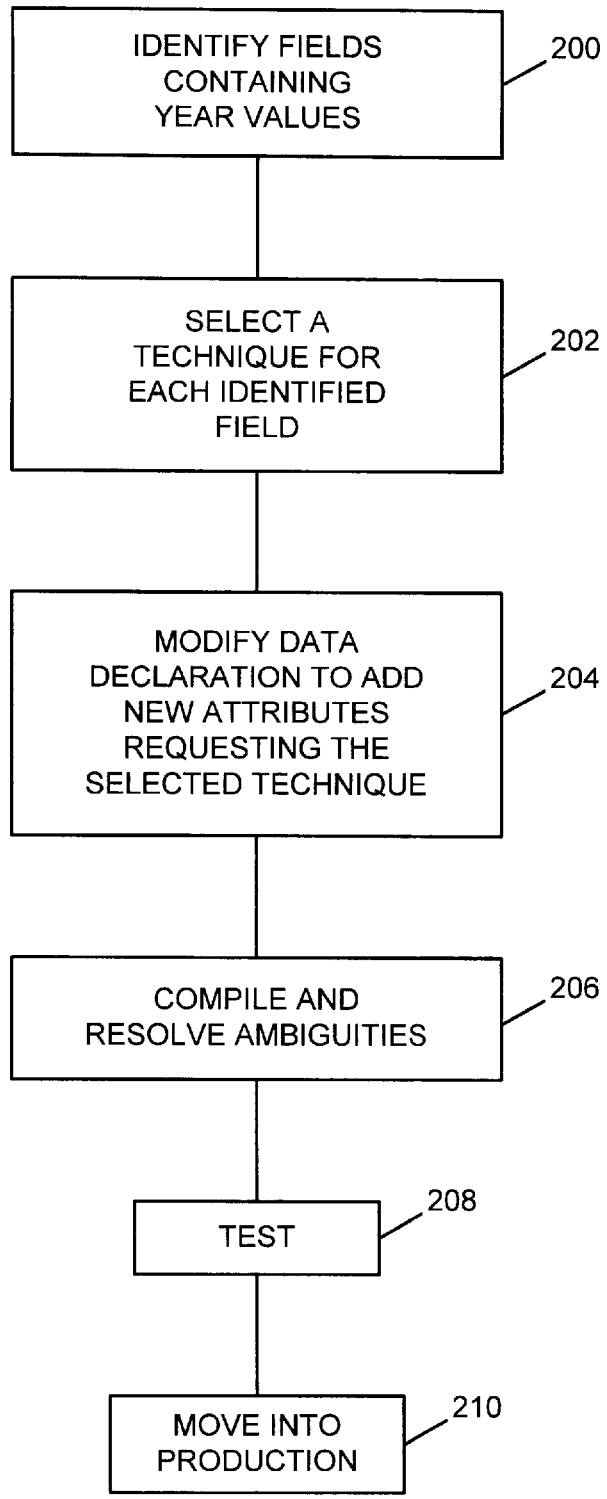
FIG. 2 is a flowchart that illustrates a general process for implementing a year 2000 solution in accordance with a preferred embodiment of the present invention.

An example procedure for effecting such source code modifications in accordance with a preferred embodiment of the invention, is shown in FIG. 2. In particular, the procedure illustrated in FIG. 2 involves a step 200 of identifying the fields in the source code that contain year and date values. Preferably, this step is carried out by the programmer, using standard, conventional analysis tools, including, but not limited to the compiler 118.

In step 202, for each field identified in step 200, the programmer determines and selects an appropriate technique for addressing the year 2000 problem, such as expansion, windowing or compression. The selection may be based on the programmer's preference and/or may be dictated by the constraints of the program, hardware or environment of use.

Once an appropriate technique has been selected for a particular field, the programmer modifies the data declaration for that field. The modification involves "decorating" the declaration by the addition of new attributes to the data definition, to identify the type of date field and to request the selected technique. In this manner, as shown as step 204, the declaration statement associated with each field identified in step 200 is modified (or decorated) with new attributes associated with a selected technique, such as windowing, compression, expansion, etc.

Thereafter, as shown in step 206, the compiler 118 compiles the source program, with the modifications made thereto. Any ambiguous references may be resolved at this stage. For example, during compilation, the compiler 118 identifies potential ambiguities relating to date fields, such as, for example, comparisons, additions or multiplications of date field information with information or values that are not date fields.

In preferred embodiments, the compiler 118 includes a routine or set of preset rules for identifying such potential ambiguities and, upon identification, for notifying the programmer of such potential ambiguities (e.g., using the monitor 110 or other suitable visual or audible means). In further preferred embodiments, the compiler 118 makes assumptions and modifications relating to the potential ambiguities based on the preset rules.

The step of notifying the programmer of the potential ambiguities allows the programmer to make further appropriate modifications to the related field, if necessary, to resolve the ambiguity. Alternatively, the programmer may determine that the potentially ambiguous statement (or an assumption and modification made by the compiler 118) is, actually, proper and, therefore, may choose to ignore the compiler's potential ambiguity notification. In typical applications, the number of potential ambiguities should be minimal. Thus, in preferred embodiments, an additional set of intrinsic functions (or built-in functions) along with the compiler, may be used by the programmer to facilitate corrections of ambiguous or erroneous statements.

Once the potential ambiguities are resolved (or ignored) pursuant to step 206, the source program 120 may then be tested (step 208) and moved into production in its normal operating environment (step 210).

The compiler preferably provides facilities, controlled by a compiler option, to flag not only ambiguous statements, but all statements that have been affected by the source code modifications made in accordance with the present process. More specifically, according to such further embodiments, a compiler option is provided to request the generation of informational, warning, and/or error messages for each source statement affected by the addition of new attributes to the data declaration statements made in accordance with the present process. These messages provide the programmer with additional information useful in understanding the effects of modifications made to the program.

The testing step 208 (or, alternatively, the compile and resolve step 206) may include an analysis process carried out with the use of debugger hooks, or the like, inserted by the compiler into the generated code, to allow user-verification of all affected statements in the source code. The compiled program with debugger hooks inserted may be run in conjunction with a debugger or other run-time analysis tool to facilitate testing.

The testing step 208 may involve additional run-time analysis to validate the decisions and identify possible run-time conflicts. For example, if it is known that a particular variable uses a particular value as a flag, run-time analysis can be done to check for places where the variable is compared to this value or set to this value when the value is not a constant but is contained in another variable.

In preferred embodiments, the process of FIG. 2 is conducted on a source program 120 (FIG. 1), on a module-by-module basis. For example, a source program may be composed of a plurality of modules, and the modules may be processed, one at a time, in any desirable sequence. In such an embodiment, for each module, step 210 involves merging the module back into the source program, after processing and testing of the module in accordance with steps 200–208.

Moreover, in further preferred embodiments the compiler is provided with a disabling option which allows a programmer to disable the use of the new attributes added in step 206. In accordance with such embodiments, each module may be modified and tested individually as noted above, and then the program may be recompiled with the disable compiler option to disable the use of the new attributes. As each module is processed, it may then be merged into production, with the usage of the new attributes disabled. This feature also allows a programmer to modify the source program in portions, e.g., module by module, while allowing the overall source program to remain operational. Thus, the source program may remain operational by controlling the compiler routine to disable the new modifications during the periods of time in which some portions of the source program have been modified and merged back into the program, while other portions have not yet been modified. As a result, the conversion time necessary for making the above-noted modifications to the source program may be minimized.

As a further feature of preferred embodiments employing a windowing technique, an option is provided for setting a default window (or for setting all of the individual windows, in a multiple window program) with a setting of 1900 to 1999. This, allows the program to run with the window(s) set to correspond to the period for which the source program was intended to operate prior to modifications (i.e., prior to the turn of the century). This procedure allows the programmer to test the operability of the modified source program, by comparing the results obtained from running the modified program with the window(s) set at the 1900 to 1999 values, with the results obtained from running the pre-modified program. The results should be the same for both runs. After such comparison, the window(s) may be changed from the 1900 to 1999 setting to the appropriate setting selected by the programmer.

Thus, the 1900 to 1999 setting allows the programmer to, for example, test the operability of the modified source program, after modifications have been added thereto. In addition, this feature allows a programmer to operate the modified source program (in effect, without modifying the result, with respect to the result that would be obtained with the source program prior to modification) until it is desirable to begin using the modified version (e.g., when date fields in the original source program will begin to be affected by the year 2000 problem). At that time, the programmer need only specify a new window (or multiple new windows for multiple window programs).

SOURCE LANGUAGE ENHANCEMENTS

As representative examples, various source language extensions for requesting year 2000 solution techniques are described herein. Although preferred embodiments of the present invention may incorporate any or all of the above-noted standard year 2000 techniques, the description herein will, for simplicity, concentrate primarily on extensions using fixed and multiple windowing and expansion. Similarly, while preferred embodiments of the present invention may be implemented for a variety of computer languages such as, but not limited to, COBOL, PL/I, and C++, for simplicity, the description herein and examples provided will use a syntax consistent with an extended standard COBOL language syntax.

In accordance with preferred embodiments of the present invention, extensions are provided to the existing standard source language, for example, COBOL or PL/I. These source language extensions provide the syntax used to decorate data declaration statements that define date related data items.

As a representative example, a DATE-FORMAT attribute with values chosen from the set YYMMDD, YYYYMMDD, YYDDD, YYYYDDD, YY, YYYY, MMDDYY and DDM-MYYYY is provided with the source language extensions of the present invention to allow the programmer to specify the format of date related data fields. DATE-FORMAT IS YYMMDD, for example, specifies that the associated data item contains a date item (sometimes referred to as a calendar date) with a 2-digit year, a 2-digit month, and a 2-digit day; YYYYDDD specifies that the associated data item contains a date item (sometimes referred to as an ordinal date) with a 4-digit year and a 3-digit day-of-year; and YY specifies that the associated data item contains a date data item consisting only of a 2-digit year.

Those skilled in the art will recognize that the examples quoted above are not intended to limit the present invention. Indeed, those skilled in the art will recognize that other date formats and syntaxes for representing date formats may be used without departing from the scope and spirit of the present invention. Furthermore, time attributes, for example, hours, minutes, seconds may also be included in additional date formats.

In addition to the DATE-FORMAT attribute for date data items, a WINDOW attribute is also provided in preferred embodiments of the present invention to allow specification of fixed window values associated with individual date data items that contain 2-digit years. The WINDOW attribute uses a syntax of WINDOW(low-value, high-value), where low-value specifies the first year in the 100 year fixed window and high-value specifies the last. For example, the following data declaration:

```
01 BIRTH-DAY PIC 9(6)    DATE-FORMAT IS YYMMDD,
                         WINDOW(1920, 2019).
``` declares a field called BIRTH-DAY that contains six numeric digits: 2 year digits, 2 month digits, and 2 day digits. The year digits in the BIRTH-DATE field are to be interpreted within the fixed window of 1920 to 2019. The window attribute may also use a syntax of WINDOW (x), where x is a base year value and where the range is defined as all years within 100 years from the base year x.

The DATE-FORMAT and WINDOW attributes may be applied to any data item which contains a digital representation of a date including but not limited to data items encoded using BINARY, DISPLAY, and PACKED-DECIMAL data formats. Those skilled in the art will recognize that other date representations and data formats may be used without departing from the scope of the present invention.

As a further example of how a COBOL program might be enabled for the year 2000, using the compiler-assisted techniques described herein, consider the following COBOL program fragment:

```
01 PERIOD PIC 99.
01 TODAYS-DATE.
    05 TODAY-YY PIC 99.
    05 TODAY-MM PIC 99.
    05 TODAY-DD PIC 99.
01 POLICY-RECORD.
. . .
    05 MATURITY-DATE.
        10 MATURITY-YY PIC 99.
        10 MATURITY-MM PIC 99.
        10 MATURITY-DD PIC 99.
. . .
* If policy is mature, update benefits record . . .
ACCEPT TODAYS-DATE FROM DATE
IF MATURITY-DATE IS GREATER THAN OR EQUAL TO
TODAYS-DATE DISPLAY "Policy maturity date:
19" MATURITY-YY
    SUBTRACT MATURITY-YY FROM TODAY-YY GIVING
PERIOD
. . .
```

Based on the source program modifications discussed herein, the following steps are used to convert the program fragment above. First, in accordance with step 200 in FIG. 2, standard static analysis tools are used to determine that the data items, PERIOD, TODAYS-DATE, TODAY-YY, MATURITY-DATE and MATURITY-YY, are date impacted. Inspection of the date impacted program statements also shows that the DISPLAY statement explicitly assumes that the current date is in the twentieth century, so that, even in the year 2002, it would print, "Policy maturity date: 1902"

In accordance with step 202 in FIG. 2, the same tools may then be used to determine that a reasonable solution would be to use windowing for the existing date data items, and introduce a new, expanded data item for correctly displaying the current year. Next, in accordance with step 204 of FIG. 2, the date and year attributes are added and the code is modified as follows:

```
1.      01 THIS-YEAR PIC 9999 DATE-FORMAT YYYY WINDOW(1950,2049).
        01 PERIOD PIC 99.
2.      01 TODAYS-DATE DATE-FORMAT YYMMDD WINDOW(1950,2049).
2.         05 TODAY-YY PIC 99 DATE-FORMAT YY WINDOW(1950,2049).
           05 TODAY-MM PIC 99.
           05 TODAY-DD PIC 99.
        01 POLICY-RECORD.
        . . .
2.         05 MATURITY-DATE DATE-FORMAT YYMMDD
              WINDOW(1950,2049).
2.            10 MATURITY-YY PIC 99 DATE-FORMAT YY
                 WINDOW(1950,2049).
              10 MATURITY-MM PIC 99.
           10 MATURITY-DD PIC 99.
        . . .
        * If policy is mature, update benefits record . . .
        ACCEPT TODAYS-DATE FROM DATE
3.      IF MATURITY-DATE IS GREATER THAN OR EQUAL TO TODAYS-DATE
4.      MOVE TODAYS-YY TO THIS-YEAR
        DISPLAY "Policy maturity date: "THIS-YEAR
5.      SUBTRACT MATURITY-YY FROM TODAY-YY GIVING PERIOD
        . . .
```

Refer to the numbered keys in the modified program fragment above, representing the steps by which the modification was made, and assume that the single, fixed window for the program is from 1950 through 2049, inclusive. In step 1, a new, expanded data item THIS-YEAR is introduced, so that the current year can be correctly displayed. In step 2, the existing data items are decorated with the appropriate date attributes. In step 3, the comparison of the decorated dates proceeds as if the year components of both dates were in the range 1950 through 2049, such that a year value of 2 would be interpreted as 2002, rather than as 1902 in the unmodified program. In step 4, TODAYS-DATE is correctly expanded to a four-digit year. In step 5, the difference between the two windowed year values, TODAY-YY and MATURITY-YY, is computed as if data values from 0 through 49 were augmented by 100, and processed as 100 through 149.

As noted above, the compiler 118 preferably conforms to ANSI COBOL or PL/I language conventions, although those skilled in the art will recognize that the compiler 118 could also conform to other language conventions without departing from the scope of the present invention. In addition, Section A below is a COBOL specification document which describes further details relating to preferred embodiments implemented with COBOL compilers, and Section B below is a PL/I specification document which describes further details relating to preferred embodiments implemented with PL/I compilers.

COMPILER OPTIONS EXTENSIONS

As representative examples, various compiler options extensions for requesting year 2000 solution techniques are described herein. Although preferred embodiments of the present invention may incorporate any or all of the above-noted standard year 2000 techniques, the description herein will, for simplicity, concentrate primarily on extensions using fixed and multiple windowing and expansion. Similarly, while preferred embodiments of the present invention may be implemented for a variety of computer languages such as, but not limited to, COBOL, PL/I, and C++, for simplicity, the description herein and examples provided will use a syntax consistent with extensions to existing COBOL compiler options.

Implementation of the preferred embodiments of the present invention, for example, in a COBOL or PL/I compiler and run-time library requires enhancements to provide support for a new compiler options to allow specification of a default window, specification of the types of messages that should be produced as a result of the insertion of enhanced data definition attributes in the source code, and the ability to enable or disable the processing of the enhanced data definition attributes in the source program.

The new compiler option YEARWINDOW(low-value, high value) is used to specify a default fixed window for date data items in the source program which are recorded with a 2-digit year format and where no WINDOW attribute is specified for the data item. Also, YEARWINDOW (x) can be used, where x is a base year value and where the range is defined as all years within 100 years from the base year x. For example, 01 BIRTH-DAY PIC 9(6) DATE-FORMAT IS YYMMDD. defines a date data item which contains a 2-digit year. However, since no WINDOW attribute is specified in the data declaration, the necessary low and high values for the window are obtained from the values provided in the YEARWINDOW compiler option, assuming it is specified. If the YEARWINDOW compiler option is specified, or if a NOYEARWINDOW compiler option is specified, then statements such as the one shown above are flagged by the compiler as an error because no window value is provided. Furthermore, NOYEARWINDOW may be a compiler directive for requesting that all window extensions added to data declaration statements be treated as comments.

If WINDOW attributes are left off all date data declaration statements in a source program, use of the YEARWINDOW compiler option allows specification of a single fixed window to be used for all date data items with 2-digit years.

The new compiler options FLAGDATE AND NOFLAGDATE specify that the compiler is to produce or omit informational and/or warning messages for each statement in the compilation unit that uses or is affected by the year 2000 language extensions. detected by the compiler are produced irrespective of the specification of the FLAGDATE/NOFLAGDATE compiler options.

The new compiler options DEBUGDATE and NODEBUGDATE specify that the compiler is to produce or omit debug hooks in the generated code for each source statement in the compilation unit that uses or is affected by the year 2000 language extensions.

Those skilled in the art will recognize that the examples of compiler options described above are not intended to limit the present invention. Indeed, those skilled in the art will recognize that additional and alternative compiler options may be used without departing from the scope of the invention.

COMPILER SUPPORT

In accordance with preferred embodiments of the present invention, compiler support is provided for recognizing and processing the above-noted extension statements and other instructions, such as instructions for disabling data definition attribute extensions (as discussed above with respect to the "disabling" option), instructions for setting a default window (as discussed above with respect to the "YEARWINDOW" option), instructions for a debugger routine as discussed above, etc. These support features may be written as part of a compiler program and run-time library specifically designed to support the original language and these enhancements. However, in preferred embodiments, existing compiler programs and run-time libraries will be upgraded or enhanced to support the recognition and processing of these source language enhancements and other instructions in a manner discussed herein.

Implementation of the preferred embodiments of the present invention, for example, in a COBOL or PL/I compiler and run-time library preferably involves enhancements to provide support for new compiler options, support for new data declaration date attributes, support for new intrinsic or built-in functions, enhanced code generation facilities to support the extended semantics and debug hooks, new or enhanced run-time library routines, and new or enhanced intrinsic functions. Enhancements to a COBOL or PL/I compiler to provide support for these functions may be readily implemented, using standard programming techniques.

With regard to the support for new compiler options, the YEARWINDOW/NOYEARWINDOW, FLAGDATE/NOFLAGDATE, and DEBUGDATE/NODEBUGDATE compiler options as described above, may be readily implemented by one skilled in the art of compiler implementation.

With regard to the new data declaration date attributes, typical implementation in a COBOL or PL/I compiler includes recognition of the new syntax, recognition and reporting of syntactic and semantic errors resulting from the introduction of the new attributes, and recording the new data attributes in the program symbol table. Such processing is consistent with the introduction of a new data type into the language or the introduction of new attributes for existing data types and is well known to those skilled in the art of compiler implementation.

With respect to the enchanced code generation facilities and new or enhanced run-time library routines, source program statements which involve the processing of date data items can be recognized by the compiler using the new attribute information recorded in the program symbol table.

When an affected data item is referenced in the body of a program for the purpose of carrying out a computation, its value is accessed and converted to a representation suitable for the specified computation. For example, if the computation specifies a comparison between and windowed date and an expanded date (with a 4-digit year), the windowed date, when accessed, could be expanded to a date with a 4-digit year so the comparison may be carried out using that representation as a common format. Similarly, if the source program specifies a date data item to be stored in a windowed date field (for example in a data move or as the result of a computation), the date data is converted to a format suitable for the receiving field using the window parameters for the receiving field as specified in the symbol table. In the process of converting the date data to the desired result format, if error handling (in COBOL, "ON SIZE ERROR") was specified, code is preferably generated to determine whether an error had occurred (that is, whether the converted date was outside the valid range of valid dates for the windowed receiving field), and if it had occurred, an appropriate error handling routine is preferably invoked.

These examples illustrate a few of a variety of techniques that could be used by those skilled in the art of compiler implementation to implement the necessary enhancements to the code generation and run-time library facilities in support of the new function. Additional examples are described below in Section A and Section B.

The compiler is also provided with support for new intrinsic function (or built-in functions, in the case of PL/I). Examples of such functions and appropriate implementations are described in the appendices.

OTHER TECHNIQUES

Approaches as discussed above may be readily implemented with a "sliding window" technique, with minimal extensions to the basic technique. In this implementation, the window is defined as an offset from the current year. For example, a data item could be defined as windowed from 30 years prior to the current year to 69 years after the current year. Thus, for such an example, the sliding window technique may be implemented, as discussed above, by extending the syntax for the operand of the WINDOW attribute as follows:

DATE-FORMAT IS YY WINDOW(*−30,+69)

In addition, the run-time initialization changes to save the value of the current year minus 1900 at the start of execution. (Assume that this value is saved in Start Year).

Furthermore, the sliding window technique requires codification of the algorithm used to convert a 2-digit year value into a form suitable for computations in conjunction with other date data items. In this case, the algorithm used for fixed windows (if value<lowrange) is still used but the "low-value" is now the value saved during initialization (described in the previous step) minus the delta specified in the WINDOW attribute.

The basic approaches described herein may also be expanded to variable window techniques. According to the variable window technique, a window is specified when the program is run, rather than when it is compiled. In this regard, a new window may be specified each time the program is run.

A compression technique could also be easily supported with a few extensions to the basic technique. Any of the popular compression algorithms could be used in conjunction with the technique. However, for purposes of simplifying the present disclosure, it is assumed that the selected compression algorithm operates to compress values which are treated as offsets from 1900 and compresses values in the range of 0 to 499. Compression algorithms which do not adhere to these restrictions could also be handled with further modifications to the basic approach.

Additional support for implementing a compression technique would include a new modifier for the YY attribute, to indicate that compression is to be used instead of windowing. For example, the following modifier may be used:

DATE-FORMAT YY COMPRESSED

If it were desirable to support more than one compression algorithm, support could be implemented, for example, by extending the basic compression syntax to allow the selection of a specific compression algorithm. For example:

DATE-FORMAT YY COMPRESSED (algorithm).

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

IBM COBOL
Year 2000 Language Extensions

Functional Characteristics

SECTION A

Contents

1.0 Functional Overview ............................................... 1

2.0 Functional Characteristics ......................................... 2
2.1 Types of Date Fields Supported ................................... 2
   2.1.1 Definition of Terms .......................................... 2
2.2 Data Formats ..................................................... 3
2.3 Compile-Time Options ............................................. 3
   2.3.1 YEARWINDOW Option ............................................ 3
   2.3.2 Interactions with Other Options .............................. 4
      2.3.2.1 ADATA Option ............................................ 4
      2.3.2.2 FLAG Option ............................................. 4
      2.3.2.3 FLAGSTD Option .......................................... 4
2.4 Syntax Extensions ................................................ 5
   2.4.1 References ................................................... 5
      2.4.1.1 Subscripting ............................................ 5
      2.4.1.2 Reference Modification .................................. 5
   2.4.2 Identification Division. ..................................... 5
   2.4.3 Environment Division ......................................... 5
      2.4.3.1 FILE-CONTROL Paragraph .................................. 5
   2.4.4 Data Division ................................................ 6
   2.4.5 Data Division—File Description Entries ...................... 6
   2.4.6 Data Division—Data Description Entries ...................... 6
      2.4.6.1 Date Fields and Aliases ................................. 6
      2.4.6.2 Level Numbers ........................................... 7
      2.4.6.3 BLANK WHEN ZERO Clause .................................. 7
      2.4.6.4 DATE-FORMAT Clause ...................................... 7
      2.4.6.5 OCCURS DEPENDING ON Clause .............................. 7
      2.4.6.6 PICTURE Clause .......................................... 8
      2.4.6.7 Group Items and Subordinate Date and Year Fields ........ 8
      2.4.6.8 REDEFINES Clause ........................................ 9
      2.4.6.9 RENAMES Clause .......................................... 10
      2.4.6.10 SIGN Clause ............................................ 11
      2.4.6.11 USAGE Clause ........................................... 11
      2.4.6.12 VALUE Clause ........................................... 11
      2.4.6.13 88 Condition-Name—VALUE Clause ........................ 12
   2.4.7 Procedure Division ........................................... 12
   2.4.8 Procedure Division—Arithmetic Expressions ................... 12
   2.4.9 Procedure Division—Conditional Expressions .................. 13
      2.4.9.1 Condition-Name Conditions ............................... 13
      2.4.9.2 Relation Conditions ..................................... 13
   2.4.10 SIZE ERROR .................................................. 14

2.4.11 Procedure Division—Statements .................................... 14
  2.4.11.1 Flagging of Date Field Use in Statements ................. 14
  2.4.11.2 ACCEPT Statement .................................... 14
  2.4.11.3 ADD Statement ....................................... 15
  2.4.11.4 CALL Statement ...................................... 15
  2.4.11.5 CANCEL Statement ................................... 15
  2.4.11.6 COMPUTE Statement .................................. 15
  2.4.11.7 DISPLAY statement ................................... 15
  2.4.11.8 DIVIDE Statement .................................... 15
  2.4.11.9 EVALUATE Statement ................................. 16
  2.4.11.10 GOTO Statement .................................... 16
  2.4.11.11 IF Statement ....................................... 16
  2.4.11.12 INITIALIZE Statement ................................ 16
  2.4.11.13 INSPECT Statement .................................. 16
  2.4.11.14 MERGE Statement ................................... 16
  2.4.11.15 MOVE Statement .................................... 16
  2.4.11.16 MULTIPLY Statement ................................. 17
  2.4.11.17 PERFORM Statement ................................. 17
  2.4.11.18 READ Statement .................................... 18
  2.4.11.19 REWRITE Statement ................................. 18
  2.4.11.20 SEARCH Statement .................................. 18
  2.4.11.21 SET Statement ..................................... 18
  2.4.11.22 SORT Statement .................................... 18
  2.4.11.23 STRING Statement ................................... 18
  2.4.11.24 SUBTRACT Statement ................................ 18
  2.4.11.25 UNSTRING Statement ................................ 18
  2.4.11.26 WRITE Statement ................................... 19
2.4.12 Intrinsic Functions ......................................... 19
  2.4.12.1 REAL-DATE ......................................... 19
  2.4.12.2 REAL-DAYS ......................................... 20
  2.4.12.3 REAL-YEAR ......................................... 20
  2.4.12.4 RELATIVE-DATE ..................................... 21
  2.4.12.5 RELATIVE-DAYS ..................................... 21
  2.4.12.6 RELATIVE-YEAR ..................................... 22
  2.4.12.7 WINDOWED-DATE .................................... 22
  2.4.12.8 WINDOWED-DAYS .................................... 23
  2.4.12.9 WINDOWED-YEAR .................................... 23
  2.4.12.10 USE-DATE-AS-IS .................................... 23

Appendix A. Arithmetic Expressions .................................. 25
A.1 Addition ................................................... 25
A.2 Subtraction ................................................ 25
A.3 Multiplication .............................................. 26
A.4 Division ................................................... 26
A.5 Exponentiation ............................................. 26

1.0 Functional Overview

The windowing technique helps address the Year 2000 problem by removing the basic assumption that all 2-digit year fields represent years from 1900 to 1999. Instead, this technique enables 2-digit year fields to represent years within any 100 year range from 1900 to 2098. For example, if a 2-digit date field contains the value 15, most current systems would interpret the year as 1915. However, if the window of valid years that could be represented by a 2-digit year field were 1960 to 2059, then the year would be interpreted as 2015.

The windowing technique has a number of possible implementations:

- Single fixed window, where all windowed date fields within a given compilation unit use the same window

- Multiple fixed windows, where each windowed date field within a give compilation unit can have its own window

- Single sliding window, where all windowed date fields within a given compilation unit use the same window relative to the current date

- Multiple sliding windows, where each windowed date field within a given compilation unit can have its own window relative to the current date Each of these implementations has its own advantages and disadvantages. However, in order to be able to produce the proposed language extensions with available resources, and in time to be of use to customers, only the single fixed window technique is proposed.

This document describes the syntax and functional characteristics of the proposed COBOL language extensions intended to assist customers modify COBOL applications to work beyond the year 2000.

It's important to understand that, whatever the merits of this proposal, it does not render unnecessary all the other work that IBM is already doing to support the transition across the year 2000. In particular, automatic date transformation can only be applied when the date usage in a customer's enterprise has already been identified. Customers must still make an assessment of their application inventory, and establish a detailed plan for managing the required modifications. Then they need tools, such as IBM's Program Understanding, to support the impact analysis. The AD team at STL is fully committed on the implementation of this and other tools, which are the pre-requisite to applying any transformations to the applications.

2.0 Functional Characteristics

The original language extensions proposed in *A Compiler Assisted Approach to the Year 2000 Problem* recommended the windowing technique be applied to operations on 2-digit year fields as opposed to operations on whole-date fields. However, examination of several hundred customer COBOL programs has shown that, while arithmetic and comparison operations on 2-digit year fields are quite frequently used language constructs, the most commonly used language constructs are comparisons of whole-date fields. It is, of course, not possible to identify all potential uses of date fields in customer programs, and the proposed year 2000 language extensions do not seek to address all such uses. Instead, the extensions are intended to address what are perceived to be the majority of customer requirements, that is the comparison of whole-date fields.

2.1 Types of Date Fields Supported

The proposed year 2000 language extensions are intended to support operations on the following types of date fields:

- Gregorian dates of the form YYMMDD
- Gregorian dates of the form YYYYMMDD
- Julian dates of the form YYDDD
- Julian dates of the form YYYYDDD
- 2-digit year fields of the form YY
- 4-digit year fields of the form YYYY

Note: The main intent of date fields with 4-digit years is to provide correct results when these are used in a limited number of constructs in combination with date fields with 2-digit years.

The proposed language extensions do not provide support for operations on the following types of fields:

- Combined year and month fields such as YYMM or YYYYMM fields
- Edited date fields such as YY/MM/DD fields
- Any other forms of date field not listed as supported

2.1.1 Definition of Terms

The following terms are used in this document to describe date and year fields:

Windowed date  A Gregorian date of the form YYMMDD, or a Julian date of the form YYDDD. When a windowed date field is operated on, the century component of the date is determined from the window specified for the compilation unit.

Real date  A Gregorian date of the form YYYYMMDD, or a Julian date of the form YYYYDDD. The century component of the date is held as part of the date field.

Windowed year  A 2-digit year. When a windowed date field is operated on, the century component of the year is determined from the window specified for the compilation unit. The term windowed year is also used throughout this document to refer to the 2-digit year component of a windowed date.

Real year    A 4-digit year field. The century component of the year is held as part of the year field. The term real year is also used throughout this document to refer to the 4-digit year component of a real date.

2.2 Data Formats

Only data items with the following data formats can be used as windowed date fields:

COMP-3
   COMPUTATIONAL-3
   DISPLAY
   PACKED-DECIMAL

In addition, for data items with any of the listed data formats to be used as date fields they must have a PICTURE string of all 9s or all Xs, as appropriate to the data format.

Date and year fields are indicated by the new DATE-FORMAT clause in the data description entry of the Data Division. Both elementary and group data items can be specified as date and year fields.

Detailed information about the syntax of the DATE-FORMAT clause and restrictions on the use of the new clause in combination with other clauses in data item descriptions is discussed in 2.4.6, "Data Division—Data Description Entries" on page 6.

2.3 Compile-Time Options

As mentioned previously, the proposed year 2000 language extensions allow for a single fixed window for all windowed date and year fields in a compilation unit. The simplest way of providing the base date of the window is by means of a new compile-time option. The new option is YEARWINDOW. The format of YEARWINDOW and the interaction of this option with other compile-time options are described in the following sections.

2.3.1 YEARWINDOW Option

The syntax of the YEARWINDOW compile-time option is:

```
┌── YEARWINDOW Option ─────────────────────────────────────────┐
│        YEARWINDOW(base-year                              )   │
│                          ,    FLAGDATE                       │
│                               NOFLAGDATE                     │
│        NOYEARWINDOW                                          │
└──────────────────────────────────────────────────────────────┘
```

Default is: NOYEARWINDOW

Abbreviations are: YW(FD|NOFD) / NOYW base-year
   A decimal number between 1900 and 1999 that represents the base year of the year window. All windowed year fields have a year relative to the base year. For example, if *base-year* is specified as 1965, all windowed years are placed within the 100-year window of 1965 to 2064, inclusive. So, a windowed year of 97 represents the year 1997, whereas a windowed year of 05 represents the year 2005.

A base year of 1900 can be used to maintain the current assumption that all 2-digit years are relative to 1900.

FLAGDATE
An information-level or warning-level diagnostic message is produced for each language element in the compilation unit that uses or is affected by the year 2000 language extensions.

NOFLAGDATE
No additional information-level or warning-level diagnostic messages are produced for language elements in the compilation unit that use or are affected by the year 2000 language extensions.

If YEARWINDOW is specified without either the FLAGDATE or NOFLAGDATE suboption, FLAGDATE is the default.

If NOYEARWINDOW is specified, all year 2000 language extensions used in the compilation unit are treated as comments, and have no effect on the run-time behavior of the program.

2.3.2 Interactions with Other Options

With the exception of the options discussed in the following sections, the YEARWINDOW option has no interaction with other compile-time options.

2.3.2.1 ADATA Option
If the ADATA compile-time option is specified in conjunction with the YEARWINDOW option, additional ADATA records and information are generated for the year 2000 language extensions.

Note: Changes to the ADATA record formats need to be specified. In addition, any such changes should be supported by corresponding changes to the Program Understanding tool.

2.3.2.2 FLAG Option
All diagnostic messages produced by the year 2000 language extensions, including the information-level diagnostic messages produced by the FLAGDATE suboption of the YEARWINDOW option, honor the FLAG compile-time option.

2.3.2.3 FLAGSTD Option
If the YEARWINDOW option is specified in conjunction with the FLAGSTD option, all year 2000 language extensions are flagged in the same way as other IBM extensions are flagged. IBM extensions are identified as "non-conforming non-standard".

2.4 Syntax Extensions

The following sections discuss the extensions to the syntax of IBM COBOL.

2.4.1 References

The use of a date or year field in references to Data Division names causes warning-level messages to be issued as described in the following sections.

2.4.1.1 Subscripting

Although a year field is a more plausible subscript than a date field, the semantics of using a windowed year as a subscript are not obvious. With a date range of 1950 through 2049, the first 49 elements of a table would not be accessible with a subscript of a 2-digit year if this were windowed. Therefore, if a windowed date field or windowed year field is used as a subscript, the field is treated as a non-date field (and a warning-level diagnostic message is produced).

Date and year fields cannot have USAGE INDEX—see 2.4.6.11, "USAGE Clause" on page 11.

2.4.1.2 Reference Modification

If a date field or year field is referenced-modified, the field is treated as a non-date field (and a warning-level diagnostic message is produced), and the unique data item defined by the reference modification is a non-date field.

2.4.2 Identification Division.

There are no extensions proposed to clauses used in the Identification Division.

2.4.3 Environment Division

Although there are no extensions proposed to the syntax of clauses used in the Environment Division, certain conditions may arise that require diagnosis. These conditions are discussed in the following sections.

2.4.3.1 FILE-CONTROL Paragraph

If a date field or year field is used as a data-name in any of the following constructs, the field is treated as a non-date field (and a warning-level diagnostic message is produced):

SELECT ... USING *data-name*

SELECT ... PASSWORD IS *data-name*

SELECT ... FILE STATUS IS *data-name data-name*

If a windowed date field or windowed year field is used as a data-name in either of the following constructs, the field is treated as a non-date field (and a warning-level diagnostic message is produced):

SELECT ... RECORD KEY IS *data-name*

SELECT ... ALTERNATE RECORD KEY IS *data-name*

2.4.4 Data Division

The following sections describe the syntax extensions required for clauses in the Data Division, and the conditions that need to be detected and diagnosed by the compiler.

2.4.5 Data Division—File Description Entries

If a date field or year field is used as a data-name in any of the following File Description (FD) or Sort Description (SD) constructs, the field is treated as a non-date field (and a warning-level diagnostic message is produced):

RECORD IS VARYING DEPENDING ON *data-name*

LABEL RECORDS IS *data-name*

LINAGE IS *data-name* FOOTING *data-name* TOP *data-name* BOTTOM *data-name*

2.4.6 Data Division—Data Description Entries

The following sections discuss the extensions to the data description entry needed for the proposed year 2000 language extensions, and the interaction between these extensions and existing clauses in the data description entry.

2.4.6.1 Date Fields and Aliases

COBOL provides several ways by which a date field can be given an alias that is visible to the compiler. These include:

The date field is contained in a level-01 record description entry within an FD, and there is another record description entry within the same FD that results in the date field having an alias.

The date field is redefined using the REDEFINES clause, or is part of a group field that is redefined.

The date field is renamed using the RENAMES clause, or is part of a grouping of data items that is renamed.

Because giving a date field an alias might result in the field being used without its date attribute, there are a number of considerations that apply. These are discussed in the following sections:

2.4.6.2, "Level Numbers" on page 7
2.4.6.8, "REDEFINES Clause" on page 9
2.4.6.9, "RENAMES Clause" on page 10

There are also ways in which a date field can have an alias without it being visible to the compiler. These include using a date field in records of files processed by different programs with different record descriptions, and passing date fields as call arguments between programs. While these forms of aliasing are not discussed in this document, it is important that they are clearly described in the documentation that ships to customers.

2.4.6.2 Level Numbers

A date field or year field can be defined with any level number from 01-49 and 77. It can be a group item or an elementary item. It can also be an item within a group item. In order to identify possible alias conflicts, an information-level diagnostic message is produced for each level-01 group item that contains one or more date or year fields.

2.4.6.3 BLANK WHEN ZERO Clause

If the BLANK WHEN ZERO clause is used in the definition of a date or year field, a warning-level diagnostic message is produced.

2.4.6.4 DATE-FORMAT Clause

In order to indicate that a data item is a date field or year field, the DATE-FORMAT clause is provided for the data description entry. The DATE-FORMAT clause specifies the format of a date or year field.

```
┌─ Format ─────────────────────────────────────────────┐
│    DATE-FORMAT          YY                            │
│                 IS      YYDDD                         │
│                         YYMMDD                        │
│                         YYYY                          │
│                         YYYYDDD                       │
│                         YYYYMMDD                      │
└───────────────────────────────────────────────────────┘
```

The DATE-FORMAT clause can be specified for a data description entry with a level-number other than 66 or 88. The supported phrases in the DATE-FORMAT clause are:

| | |
|---|---|
| YY | Specifies the data item is a windowed year |
| YYDDD | Specifies the data item is a windowed Julian date |
| YYMMDD | Specifies the data item is a windowed Gregorian date |
| YYYY | Specifies the data item is a real year |
| YYYYDDD | Specifies the data item is a real Julian date |
| YYYYMMDD | Specifies the data item is a real Gregorian date |

The allowable USAGE clauses and PICTURE clauses for data items specified with the DATE-FORMAT clause are listed in 2.4.6.11, "USAGE Clause" on page 11 and 2.4.6.6, "PICTURE Clause" on page 8, respectively.

2.4.6.5 OCCURS DEPENDING ON Clause

The following restrictions apply to the use of date and year fields in the OCCURS DEPENDING ON clause:

> If a date or year field is used as the object of an OCCURS DEPENDING ON clause, the field is treated as a non-date field (and a warning-level diagnostic message is issued).

> If a windowed date or windowed year field is used as a data-name in an ASCENDING/DESCENDING KEY phrase of an OCCURS DEPENDING ON clause, the field is treated as a non-date field (and a warning-level diagnostic message is produced).

2.4.6.6 PICTURE Clause

Only the following combinations of DATE-FORMAT clause, USAGE clause, and PICTURE clause are supported. Note that COMP-3, COMPUTATIONAL-3, and PACKED-DECIMAL are considered identical for this purpose.

| USAGE and DATE-FORMAT Clauses | PICTURE Clause |
| --- | --- |
| DISPLAY DATE-FORMAT YY | 2 Xs or 2 9s |
| DISPLAY DATE-FORMAT YYDDD | 5 Xs or 5 9s |
| DISPLAY DATE-FORMAT YYMMDD | 6 Xs or 6 9s |
| DISPLAY DATE-FORMAT YYYY | 4 Xs or 4 9s |
| DISPLAY DATE-FORMAT YYYYDDD | 7 Xs or 7 9s |
| DISPLAY DATE-FORMAT YYYYMMDD | 8 Xs or 8 9s |
| COMP-3 DATE-FORMAT YY | 2 9s |
| COMP-3 DATE-FORMAT YYDDD | 5 9s |
| COMP-3 DATE-FORMAT YYMMDD | 6 9s |
| COMP-3 DATE-FORMAT YYYY | 4 9s |
| COMP-3 DATE-FORMAT YYYYDDD | 7 9s |
| COMP-3 DATE-FORMAT YYYYMMDD | 8 9s |

> Implementation Note
>
> If the appropriate PICTURE clause is not specified for a date or year field, an error-level diagnostic message is produced, and the DATE-FORMAT clause is discarded.

2.4.6.7 Group Items and Subordinate Date and Year Fields

If requested, an information-level diagnostic message is produced for every group item that contains a date or year field in addition to other data items.

If a group item is defined as a date or year field, the elementary items in the group must all be USAGE DISPLAY, and the length of the group item must be one of the following, according to the DATE-FORMAT clause specified:

| DATE-FORMAT Clause | Item Length |
| --- | --- |
| YY | 2 bytes |
| YYDDD | 5 bytes |
| YYMMDD | 6 bytes |
| YYYY | 4 bytes |
| YYYYDDD | 7 bytes |
| YYYYMMDD | 8 bytes |

> Implementation Note
>
> If the group item does not have the correct length, or if any elementary item within the group has a data format other than DISPLAY, an error-level diagnostic message is produced, and the DATE-FORMAT clause is discarded.

If a group consists solely of a date or year field, then the group item and subordinate item must have matching data formats and DATE-FORMAT clauses, or a warning-level diagnostic message is produced.

If a group item is validly defined as a date field or year field, then:

Any named (not FILLER) subordinate item that consists of exactly the year portion of the date or year field must have a DATE-FORMAT clause that corresponds to the DATE-FORMAT clause used on the group item, or a warning-level diagnostic message is produced.

If a named (not FILLER) subordinate item is defined that consists of part of the year or all of the year portion of the group item, but not solely the year portion, then a warning-level diagnostic message is produced.

2.4.6.8 REDEFINES Clause

As stated previously, whenever a group item contains a date or year field, an information-level diagnostic message is produced if requested. In addition, whenever a group item that contains a date or year field along with any other fields is the subject or the object of a REDEFINES clause, an information-level diagnostic message is produced for each redefinition.

When, on the other hand, any item, whether group or elementary, that consists solely of a date field is the subject or the object of a REDEFINES clause, then the following restrictions and conditions apply:

If the redefining item is named (not FILLER), and the length of the redefining item exactly matches that of the redefined item, then the redefining item must have the same data format and DATE-FORMAT clause as the redefined item. Note that COMP-3, COMPUTATIONAL-3, and PACKED-DECIMAL are considered identical for this purpose. If the redefinition is not valid, a warning-level diagnostic message is produced.

Given the data definition:

```
1 DATE-YYMMDD        PIC X(6) DATE-FORMAT YYMMDD.
``` the following redefinitions are valid:

```
1 DATE-YYMMDD-EL-1   REDEFINES DATE-YYMMDD
                     PIC 9(6) DATE-FORMAT YYMMDD.

1 DATE-YYMMDD-GRP-1  REDEFINES DATE-YYMMDD DATE-FORMAT YYMMDD.
    3 YY-1           PIC XX DATE-FORMAT YY.
    3 MMDD-1         PIC XXXX.
    3 MMDD-GRP-1     REDEFINES MMDD.
        5 MM-1       PIC XX.
        5 DD-1       PIC XX.

1 DATE-YYMMDD-GRP-2  REDEFINES DATE-YYMMDD DATE-FORMAT YYMMDD.
    3                PIC XX.
    3 MM-2           PIC XX.
    3 DD-2           PIC XX.
``` whereas the following redefinitions are invalid:

```
1 DATE-YYMMDD-GRP-4  REDEFINES DATE-YYMMDD.
    3 YY-4           PIC XX.
    3 MM-4           PIC XX.
    3 DD-4           PIC XX.

1 DATE-YYMMDD-GRP-7  REDEFINES DATE-YYMMDD
                     DATE-FORMAT YYMMDD
    3                PIC X.
    3 YMM-7          PIC XXX.
    3 DD-7           PIC XX.
```

Similarly,

```
1 NON-DATE-FIELD    PIC X(6).

1 DATE-YYMMDD       REDEFINES NON-DATE-FIELD
                    PIC X(6) DATE-FORMAT YYMMDD.
``` is invalid.

If the length of the REDEFINES subject and the REDEFINES object are not the same, a warning-level diagnostic message is produced.

Given the data definition:

```
1 DATE-YYMMDD       PIC X(6) DATE-FORMAT YYMMDD.
``` the following redefinitions cause a warning-level diagnostic message to be produced:

```
1 DATE-TIME-GRP-5   REDEFINES DATE-YYMMDD.
  3 YY-5            PIC XX DATE-FORMAT YY.
  3 MM-5            PIC XX.
  3 DD-5            PIC XX.
  3 TM-5            PIC X(6).

1 DATE-YYMM-GRP-6   REDEFINES DATE-YYMMDD.
  3                 PIC XX.
  3 MM-6            PIC XX.

1 DATE-Y-1          REDEFINES DATE-YYMMDD PIC X.

1 DATE-YYMM-2       REDEFINES DATE-YYMMDD PIC XXXX.
```

2.4.6.9 RENAMES Clause

If a complete date field or year field forms all or part of a grouping of renamed data items, an information-level diagnostic is produced. For example, given the following data definition:

```
1 A-RECORD.
  3 OTHER-FIELD     PIC X(1 ).
  3 DATE-FIELD      DATE-FORMAT YYMMDD.
    5 DATE-YY       PIC XX DATE-FORMAT YY.
    5 DATE-YY-RD    REDEFINES DATE-YY.
      1 DATE-Y1     PIC X.
      1 DATE-Y2     PIC X.
    5 DATE-MM       PIC XX.
    5 DATE-DD       PIC XX.
  3 TIME-FIELD
    5 TIME-HH       PIC XX.
    5 TIME-MM       PIC XX.
    5 TIME-SS       PIC XX.
``` the following instances of the RENAMES clause cause an information-level message to be produced (in addition to the warning-level messages caused by the improper date redefinitions):

```
66 DATE-STAMP RENAMES OTHER-FIELD THRU DATE-FIELD.
66 TIME-STAMP RENAMES DATE-FIELD THRU TIME-FIELD.
66 HOUR-STAMP RENAMES DATE-FIELD THRU TIME-HH.
66 DATE-GROUP RENAMES DATE-FIELD.
```

However, if the year component of a date field is included or partly included in a grouping of renamed items, but the whole date field is not included, then a warning-level diagnostic message is produced. For example, given the previous definition of A-RECORD, the following instances of the RENAMES clause cause warning-level messages to be produced:

```
66  PREFIX-DATE RENAMES OTHER-FIELD THROUGH DATE-YY.
66  DATE-YYMM RENAMES DATE-YY THROUGH DATE-MM.
66  DATE-YMMDD RENAMES DATE-Y2 THROUGH DATE-DD.
66  DATE-YY-RN RENAMES DATE-YY.
``` whereas the following instance of RENAMES would not be diagnosed, since it does not include the year part of the date field at all:

```
66  MONTH-STAMP RENAMES DATE-MM THRU TIME-MM.
```

2.4.6.10 SIGN Clause
The SIGN clause is not supported in the definition of a date field or year field.

---
Implementation Note

If the SIGN clause is specified in conjunction with the DATE-FORMAT clause, an error-level diagnostic message is produced, and the DATE-FORMAT clause is discarded.

---

2.4.6.11 USAGE Clause
One of the following data formats must be specified or assumed:

COMP-3
COMPUTATIONAL-3
DISPLAY
PACKED-DECIMAL

---
Implementation Note

If an appropriate USAGE clause is not specified or assumed for a date or year field, an error-level diagnostic message is produced, and the DATE-FORMAT clause is discarded.

---

2.4.6.12 VALUE Clause
A real date field is not affected by the year window specified for the compilation unit. The year in a real date is always assumed to be relative to zero. Therefore, if a real date field is defined with a VALUE clause, the value specified in the clause is treated as a non-date literal, and no attempt is made to interpret the value according to the year window. For example, if a year window of 1996 to 2095 were specified, then in the following definition, the compiled value of DATE-FIELD-Y4 would be 00051220 and not 20051220.

```
5  DATE-FIELD-Y4     PIC 9(8) DATE-FORMAT YYYYMMDD
                         VALUE IS   5122 .
```

However, in a windowed date field, the year is determined based upon the year window. So, to continue the previous example, if a windowed date field were defined with the same value clause as the previous real date field, at run time the windowed date field would be seen as having a year value of 2005.

If a date or year field with a data format of DISPLAY and a PICTURE clause of Xs is defined with a value that contains nonnumeric characters or an insufficient number of characters for the length of the field, then a warning-level diagnostic message is produced.

2.4.6.13 88 Condition-Name—VALUE Clause

The VALUE clause of a condition-name associated a date field is similar to the VALUE clause discussed in the previous section. For a real date, it represents a year relative to zero. For a windowed date, it represents a year based upon the year window.

Note: The run-time behavior of condition-names in expressions is different from that of literals. A condition-name is tightly coupled with the date field with which it is associated, and is interpreted according to the defined year window. For example, suppose a year window 1975 to 2074 were specified, and a date field of the form YYMMDD contained a value of 051220. Then, with the following definitions:

```
5    DATE-FIELD       PIC 9(6) DATE-FORMAT YYMMDD
  88 DATE-TARGET               VALUE IS 5122 .
``` the condition

```
IF DATE-TARGET
``` would evaluate to true, whereas the condition

```
IF DATE-FIELD = 5122
``` would evaluate to false, because literals, except those in condition names, are not windowed when used in comparisons with windowed date fields. However, if the REAL-DATE intrinsic function, described in 2.4.12, "Intrinsic Functions" on page 19, were used as follows:

```
IF DATE-FIELD = FUNCTION REAL-DATE( 5122 )
``` the condition would evaluate to true.

2.4.7 Procedure Division

The following sections describe the language extensions needed to implement date and year field support. Most of the extensions are in the areas of conditional expression evaluation, and diagnosis of the use of date and year fields in statements.

2.4.8 Procedure Division—Arithmetic Expressions

The first release of the year 2000 language extensions does not support the use of date and year fields in arithmetic expressions. Therefore, if a date or year field is used in an arithmetic expression, the field is treated as non-date field (and a warning-level diagnostic message is produced).

---
Implementation Note

Although the first release of the year 2000 language extensions does not support the use of date and year fields in arithmetic expressions, the rules for possible future support are described in Appendix A, "Arithmetic Expressions" on page 25.

---

2.4.9 Procedure Division—Conditional Expressions

Date fields and year fields should not be used in sign conditions. If a date or year field is specified in a sign condition, the field is treated as a non-date field (and a warning-level diagnostic message is produced).

The following sections discuss the use of date and year fields in condition-name conditions and relation conditions.

2.4.9.1 Condition-Name Conditions

For a discussion of condition-name conditions, see 2.4.6.13, "88 Condition-Name—VALUE Clause" on page 12.

2.4.9.2 Relation Conditions

Date and year fields can be either alphanumeric or internal decimal items, and the existing COBOL rules for comparing such items still apply. For example, attempting to compare an alphanumeric date field with an internal decimal date field would result in a severe-level message as usual. In order for the date and year field comparisons to work properly, they need to be compared with other date and year fields of the appropriate class and category.

The following chart summarizes the permissible comparisons of date fields. For the purposes of this chart, the term Non-date includes data items defined without a date USAGE clause, and literals.

The symbols used in Table 1 and Table 2 are as follows:

SC    Standard COBOL comparison of non-date numeric or nonnumeric operands
WC,I    Windowed comparison with information-level diagnostic message
WC,W    Windowed comparison with warning-level diagnostic message
SC,I    Standard comparison with information-level date diagnostic message
SC,W    Standard comparison with warning-level date diagnostic message

Note: A *windowed comparison* is executed as if all windowed and non-windowed years in the relation condition were changed to the number of years since 1900, based upon the year window for the compilation unit, before the comparison is performed according to normal COBOL rules. Non-date items in the comparison are not adjusted. Non-numeric comparisons are not changed to numeric comparisons by the windowed year promotion.

*Table 1. Permissible Comparisons of Date Fields*

| First Operand | Second Operand | | | | |
|---|---|---|---|---|---|
| | WGD | WJD | RGD | RJD | ND |
| Windowed Gregorian Date (WGD) | WC,I | SC,W | WC,I | SC,W | WC,W |
| Windowed Julian Date (WJD) | SC,W | WC,I | SC,W | WC,I | WC,W |
| Real Gregorian Date (RGD) | WC,I | SC,W | SC,I | SC,W | SC,I |
| Real Julian Date (RJD) | SC,W | WC,I | SC,W | SC,I | SC,I |
| Non-date (ND) | WC,W | WC,W | SC,I | SC,I | SC |

The following chart summarizes the permissible comparisons of year fields. For the purposes of this chart, the term Non-year includes data items defined without a year USAGE clause, and literals.

Table 2. Permissible Comparisons of Year Fields

|  | Second Operand | | |
| --- | --- | --- | --- |
| First Operand | WY | RY | NY |
| Windowed Year (WY) | WC,I | WC,I | WC,W |
| Real Year (RY) | WC,I | SC,I | SC,I |
| Non-year (NY) | WC,W | SC,I | SC |

2.4.10 SIZE ERROR

When a date field containing a windowed year is the receiving data item in an arithmetic statement that has the ON SIZE ERROR phrase specified, date-specific processing rules are used. These are best explained by an example.

If the year window were specified as 1947 through 2046, then values from 47 through 146 to be stored in the windowed year part of the date are valid, and result in stored values of 47 through 99 then 0 through 46 in the windowed year. Any other values, including negative values, cause the SIZE ERROR imperative to be executed.

2.4.11 Procedure Division—Statements

The following sections discuss those COBOL statements affected by the year 2000 language extensions.

2.4.11.1 Flagging of Date Field Use in Statements

Any use of a date field or year field in a Procedure Division statement causes an information-level message to be issued, if the use does not also cause a more specific date diagnostic message.

2.4.11.2 ACCEPT Statement

A date field can be specified as the receiving field in the following types of ACCEPT statement:

ACCEPT *identifier* FROM DATE

If the date field identified by *identifier* is not a Gregorian windowed date field (YYMMDD), then a warning-level diagnostic message is produced. If the date field is windowed Gregorian date field, an information-level diagnostic message is produced indicating that the received date will be windowed.

ACCEPT *identifier* FROM DAY

If the date field identified by *identifier* is not a Julian windowed date field (YYDDD), then a warning-level diagnostic message is produced. If the date field is windowed Julian date field, then an information-level diagnostic message is produced indicating that the received date will be windowed.

If a date field or year field is specified as the receiving field in any other form of the ACCEPT statement, the field is treated as a non-date field (and a warning-level diagnostic message is produced).

2.4.11.3 ADD Statement

A windowed date or year field may only be specified as a receiving field in an ADD statement. If a windowed date field is specified as other than a receiving field, the field is treated as a non-date field (and a warning-level diagnostic message is produced).

> Implementation Note
>
> Although the first release of the year 2000 language extensions does not support the use of date and year fields in arithmetic expressions, the rules for possible future support are described in Appendix A, "Arithmetic Expressions" on page 25.

2.4.11.4 CALL Statement

If a date field or year field is used as the field containing the program name, the field is treated as a non-date field (and a warning-level diagnostic message is produced).

2.4.11.5 CANCEL Statement

If a date field or year field is used as the field containing the program name, the field is treated as a non-date field (and a warning-level diagnostic message is produced).

2.4.11.6 COMPUTE Statement

A windowed date or year field may only be specified as a receiving field in a COMPUTE statement. If a windowed date or year field is specified as other than a receiving field, the field is treated as a non-date field (and a warning-level diagnostic message is produced).

> Implementation Note
>
> Although the first release of the year 2000 language extensions does not support the use of date and year fields in arithmetic expressions, the rules for possible future support are described in Appendix A, "Arithmetic Expressions" on page 25.

2.4.11.7 DISPLAY statement

If a windowed date or windowed year field is displayed using a DISPLAY statement, the year is not converted to a 4-digit year. The field is displayed as though it had been specified without the date or year attribute.

2.4.11.8 DIVIDE Statement

A windowed date or year field may only be specified as a receiving field in a DIVIDE statement. If a windowed date or year field is specified as other than a receiving field, the field is treated as a non-date field (and a warning-level diagnostic message is produced).

2.4.11.9 EVALUATE Statement

A date or year field can be used in a conditional expression in an EVALUATE statement. For a discussion of using date and year fields in conditional expressions, see 2.4.9, "Procedure Division—Conditional Expressions" on page 13.

If a date or year field is coded in an arithmetic expression in an EVALUATE statement, the field is treated as a non-date field (and a warning-level diagnostic message is produced).

┌── Implementation Note ──────────────────────────────────────┐
│ Although the first release of the year 2000 language extensions does not │
│ support the use of date and year fields in arithmetic expressions, the rules for │
│ possible future support are described in Appendix A, "Arithmetic Expressions" │
│ on page 25. │
└─────────────────────────────────────────────────────────────┘

2.4.11.10 GOTO Statement

If a date or year field is specified as the identifier in a GOTO ... DEPENDING ON statement, the field is treated as an non-date field (and a warning-level diagnostic message is produced).

2.4.11.11 IF Statement

A date or year field can be used in a conditional expression in an IF statement. For a discussion of using date and year fields in conditional expressions, see 2.4.9, "Procedure Division—Conditional Expressions" on page 13.

2.4.11.12 INITIALIZE Statement

The INITIALIZE statement is functionally equivalent to one or more MOVE statements. For a description of how the MOVE statement is affected by date and year fields, see 2.4.11.15, "MOVE Statement."

2.4.11.13 INSPECT Statement

If a date field or year field is specified in an INSPECT statement, the field is treated as a non-date field (and a warning-level diagnostic message is produced).

2.4.11.14 MERGE Statement

If a windowed date field or windowed year field is specified as a key in the ASCENDING/DESCENDING KEY phrase of the MERGE statement, a warning-level diagnostic message is produced that says that the date or year field is not windowed during the merge operation.

2.4.11.15 MOVE Statement

The use of a date field in a MOVE statement is supported as described in Table 4.

The symbols used in Table 3 and Table 4 have the following meanings:

| | |
|---|---|
| SM | Standard implementation following the normal COBOL rules for using the MOVE statement to move non-date numeric or nonnumeric operands |
| WM,I | Windowed move with information-level diagnostic message |
| SM,I | Standard move with information-level date diagnostic message |
| SM,W | Standard move with warning-level diagnostic message |

Note: A *windowed move* is executed as if the windowed year in the sending field were changed to a real year based upon the year window for the compilation unit before the move is performed according to normal COBOL rules. The only types of windowed moves supported are moving a windowed date field to a real date field, and moving a windowed year field to a real year field. Non-numeric moves are not changed to numeric moves by the windowed year promotion.

*Table 3. Behavior of Moving Date Fields*

| Receiving Field | Sending Field | | | | |
| --- | --- | --- | --- | --- | --- |
|  | WGD | WJD | RGD | RJD | ND |
| Windowed Gregorian Date (WGD) | SM,I | SM,W | SM,I# SM,W@ | SM,W | SM,W# SM,W@ |
| Windowed Julian Date (WJD) | SM,W | SM,I | SM,W | SM,I# SM,W@ | SM,W# SM,W@ |
| Real Gregorian Date (RGD) | WM,I | SM,W | SM,I | SM,W | SM,I |
| Real Julian Date (RJD) | SM,W | WM,I | SM,W | SM,I | SM,I |
| Non-date (ND) | SM,W | SM,W | SM,W | SM,W | SM |

Note: The symbol # indicates the move is numeric; the symbol @ indicates the move is alphanumeric.

The use of a date field in a MOVE statement is supported as described in Table 4.

*Table 4. Behavior of Moving Year Fields*

| Receiving Field | Sending Field | | |
| --- | --- | --- | --- |
|  | WY | RY | NY |
| Windowed Year (WY) | SM,I | SM,I# SM,W@ | SM,W# SM,W@ |
| Real Year (RY) | WM,I | SM,I | SM,I |
| Non-year (NY) | SM,W | SM,W | SM |

Note: The symbol # indicates the move is numeric; the symbol @ indicates the move is alphanumeric.

2.4.11.16 MULTIPLY Statement

A windowed date or year field may only be specified as a receiving field in a MULTIPLY statement. If a windowed date or year field is specified as other than a receiving field, the field is treated as a non-date field (and a warning-level diagnostic message is produced).

2.4.11.17 PERFORM Statement

If a date or year field is specified as the identifier in the TIMES phrase of a PERFORM statement, the field is treated as a non-date field (and a warning-level diagnostic message is produced).

If a date or year field is specified as an identifier in the VARYING phrase of a PERFORM statement (except within the conditional expression), the field is treated as a non-date field (and a warning-level diagnostic message is issued).

2.4.11.18 READ Statement

If the receiving field of a READ file-name INTO identifier statement is a date or year field, or if the record selected as the sending field for the move is defined as consisting solely of a date or year field, the record is moved from the record area to the receiving field according to the rules described in 2.4.11.15, "MOVE Statement" on page 16.

2.4.11.19 REWRITE Statement

If the field specified in the FROM phrase of a REWRITE record-name FROM identifier statement is a date or year field, or if the record is defined as consisting solely of a date or year field, the data is moved to the record area according to the rules described in 2.4.11.15, "MOVE Statement" on page 16.

2.4.11.20 SEARCH Statement

If a date field or year field is specified as an identifier in the VARYING phrase of a serial SEARCH statement, the field is treated as a non-date field (and a warning-level diagnostic message is produced).

2.4.11.21 SET Statement

If a date field or year field is specified in a SET statement, the field is treated as a non-date field (and a warning-level diagnostic message is produced).

2.4.11.22 SORT Statement

If a windowed date field or windowed year field is specified as a key in the ASCENDING/DESCENDING KEY phrase of the SORT statement, a warning-level diagnostic message is produced that says that the date or year field is not windowed during the sort operation.

2.4.11.23 STRING Statement

If a date field or year field is specified in a STRING statement, the field is treated as a non-date field (and a warning-level diagnostic message is produced).

2.4.11.24 SUBTRACT Statement

A windowed date or year field may only be specified as a receiving field in a SUBTRACT statement. If a windowed date or year field is specified as other than a receiving field, the field is treated as a non-date field (and a warning-level diagnostic message is produced).

> Implementation Note
>
> Although the first release of the year 2000 language extensions does not support the use of date and year fields in arithmetic expressions, the rules for possible future support are described in Appendix A, "Arithmetic Expressions" on page 25.

2.4.11.25 UNSTRING Statement

If a date field or year field is specified in an UNSTRING statement, the field is treated as a non-date field (and a warning-level diagnostic message is produced).

2.4.11.26 WRITE Statement

If the field specified in the FROM phrase of a WRITE *record-name* FROM *identifier* statement is a date or year field, or if the record is defined as consisting solely of a date or year field, the data is moved to the record area according to the rules described in 2.4.11.15, "MOVE Statement" on page 16.

If a date field or year field is specified in the ADVANCING phrase of a WRITE statement, the field is treated as a non-date field (and a warning-level diagnostic message is produced).

2.4.12 Intrinsic Functions

With the exception of the USE-DATE-AS-IS intrinsic function, if a date field or year field is used as an argument to an intrinsic function, the field is treated as a non-date field (and a warning-level diagnostic message is produced).

The following sections discuss the new intrinsic functions that are added to provide windowed date and windowed year support. The new intrinsic functions are provided to allow non-date fields to be used in combination with date fields, such as in assignments or comparisons, without causing a warning-level diagnostic message to be produced. For example, the following code causes a warning-level diagnostic message to be produced by the MOVE statement:

```
77 DATE-1          PIC 9(6) DATE-FORMAT YYMMDD.
 .
 .
 .
MOVE 2  5122  TO DATE-1.
``` but the following code prevents the warning-level message from being produced:

```
MOVE FUNCTION WINDOWED-DATE(2  5122 ) TO DATE-1.
```

2.4.12.1 REAL-DATE

The REAL-DATE function converts a Gregorian date from the form YYMMDD to the form YYYYMMDD, using the year window specified for the compilation unit.

The function type depends on the argument type, as follows:

| Argument Type | Function Type |
|---|---|
| Alphanumeric | Alphanumeric |
| Integer | Integer |

―― Format ――――――――――――――――――――――――――――――――――――
```
FUNCTION REAL-DATE  (argument-1)
```
――――――――――――――――――――――――――――――――――――――――――― argument-1

Must be a Gregorian date of the form YYMMDD, where:

YY represents a year within the year window specified by the YEARWINDOW compile-time option. It must be between 00 and 99, inclusive.

MM represents a month and must be between 01 and 12, inclusive.

DD represents a day and must be between 01 and 31, inclusive, and must be valid for the specified month and year combination.

The returned value is a real date field of the form YYYYMMDD, where YYYY represents the year in the Gregorian calendar, including the century as determined from the year window specified for the compilation unit, MM is the month specified in *argument-1*, and DD is the day specified in *argument-1*.

2.4.12.2 REAL-DAYS

The REAL-DAYS function converts a Julian date from the form YYDDD to the form YYYYDDD, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION REAL-DAYS (argument-1)
``` argument-1
Must be a valid Julian date of the form YYDDD, where

YY represents a year within the year window specified by the YEARWINDOW compile-time option. It must be between 00 and 99, inclusive.

DDD represents a day of the year. It must be between 001 and 366, inclusive, and must be valid for the year specified.

The returned value is a real date field of the form YYYYDDD, where YYYY represents the year in the Gregorian calendar, including the century as determined from the year window specified for the compilation unit, and DDD is the day of the year specified in *argument-1*.

2.4.12.3 REAL-YEAR

The REAL-YEAR function converts a year from the form YY to the form YYYY, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION REAL-YEAR (argument-1)
``` argument-1
Must be a year within the window specified by the YEARWINDOW compile-time option. It must be between 00 and 99, inclusive.

The returned value is a real year of the form YYYY, where YYYY represents the year in the Gregorian calendar, including the century as determined from the year window specified for the compilation unit.

2.4.12.4 RELATIVE-DATE

The RELATIVE-DATE function converts a Gregorian date from the form YYMMDD to the form YYYMMDD, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION RELATIVE-DATE  (argument-1)
``` argument-1

Must be a Gregorian date of the form YYMMDD, where:

YY represents a year within the year window specified by the YEARWINDOW compile-time option. It must be between 00 and 99, inclusive.

MM represents a month and must be between 01 and 12, inclusive.

DD represents a day and must be between 01 and 31, and must be valid for the specified month and year combination.

The returned value is a relative date of the form YYYMMDD, where YYY represents the number of years since 1900 (as determined from the year window specified for the compilation unit) of the year field specified in *argument-1*, MM is the month specified in *argument-1*, and DD is the day specified in *argument-1*.

2.4.12.5 RELATIVE-DAYS

The RELATIVE-DAYS function converts a Julian date from the form YYDDD to the form YYYDDD, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION RELATIVE-YEAR  (argument-1)
``` argument-1

Must be a valid Julian date of the form YYDDD, where

YY represents a year within the year window specified by the YEARWINDOW compile-time option. It must be between 00 and 99, inclusive.

DDD represents a day of the year. It must be between 001 and 366, inclusive, and must be valid for the year specified.

The returned value is a relative date of the form YYYDDD, where YYY represents the number of years since 1900 (as determined from the year window specified for the compilation unit) of the year field specified in *argument-1*, and DDD is the day of the year specified in *argument-1*.

2.4.12.6 RELATIVE-YEAR

The RELATIVE-YEAR function converts a year from the form YY to the form YYY, using the year window specified for the compilation unit.

The function type depends on the argument type, as follows:

Argument Type  Function Type
Alphanumeric       Alphanumeric
Integer            Integer

Format

```
FUNCTION RELATIVE-DAYS  (argument-1)
``` argument-1

Must be a year within the window specified by the YEARWINDOW compile-time option. It must be between 00 and 99, inclusive.

The returned value is a relative year of the form YYY, where YYY represents the number of years since 1900 (as determined from the year window specified for the compilation unit) of the year field specified in *argument-1*.

2.4.12.7 WINDOWED-DATE

The WINDOWED-DATE function converts a Gregorian date from the form YYYYMMDD to the form YYMMDD, using the year window specified for the compilation unit.

The function type depends on the argument type, as follows:

Argument Type  Function Type
Alphanumeric       Alphanumeric
Integer            Integer

Format

```
FUNCTION WINDOWED-DATE  (argument-1)
``` argument-1

Must be a Gregorian date of the form YYYYMMDD, where:

YYYY represents a year within the year window specified by the YEARWINDOW compile-time option. It must be between 1900 and 2098 inclusive.

MM represents a month and must be between 01 and 12, inclusive.

DD represents a day and must be between 01 and 31, and must be valid for the specified month and year combination.

The returned value is a windowed date field of the form YYMMDD, where YY represents the year specified in *argument-1*, with the century component removed, MM is the month specified in *argument-1*, and DD is the day specified in *argument-1*.

2.4.12.8 WINDOWED-DAYS

The WINDOWED-DAYS function converts a Julian date from the form YYYYDDD to the form YYDDD, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION WINDOWED-DAYS  (argument-1)
``` argument-1

Must be a Julian date of the form YYYYDDD, where:

YYYY represents a year within the year window specified by the YEARWINDOW compile-time option. It must be between 1900 and 2098 inclusive.

DDD represents a day of the year. It must be between 001 and 366, inclusive, and must be valid for the year specified.

The returned value is a windowed date field of the form YYDDD, where YY represents the year specified in *argument-1*, with the century component removed, and DDD is the day of the year specified in *argument-1*.

2.4.12.9 WINDOWED-YEAR

The WINDOWED-YEAR function converts a year from the form YYYY to the form YY, using the year window specified for the compilation unit.

The function type depends on the argument type, as follows:

| Argument Type | Function Type |
|---|---|
| Alphanumeric | Alphanumeric |
| Integer | Integer |

Format

```
FUNCTION WINDOWED-YEAR  (argument-1)
``` argument-1

Must be a year within the window specified by the YEARWINDOW compile-time option. It must be between 1900 and 2098 inclusive.

The returned value is a windowed year field of the form YY, where YY represents the year specified in *argument-1*, with the century component removed.

2.4.12.10 USE-DATE-AS-IS

The USE-DATE-AS-IS allows a date or year field to be used in conjunction with a non-date or non-year field, such as in a comparison, without any windowing and without causing a warning-level diagnostic message to be issued.

The function type depends on the argument type, as follows:

Argument Type
Alphanumeric
Integer

Function Type
Alphanumeric
Integer

```
Format
    FUNCTION USE-DATE-AS-IS  (argument-1)
``` argument-1
Can be any Gregorian date of either the form YYYYMMDD or YYMMDD, or a Julian date of the form YYYYDDD or YYDDD, and a year of the form YYYY or YY.

The returned value is a non-date field that contains the value of *argument-1* unchanged.

Appendix A. Arithmetic Expressions

The following sections discuss the types of arithmetic operations that are permissible on date and year fields.

A.1 Addition

The following chart summarizes the types of results that are produced when a date field is part of an addition, and the level of diagnostic message produced when the statement containing the addition is compiled. For the purposes of this chart, the term Non-date includes data items defined without a date CONTENT clause, and literals.

Table 5. Results of Using Date Fields in Addition

| First Operand | Second Operand | | | | |
|---|---|---|---|---|---|
| | WGD | WJD | RGD | RJD | ND |
| Windowed Gregorian Date (WGD) | ND,$W_2$ | ND,$W_1$ | ND,$W_1$ | ND,$W_1$ | WGD,I |
| Windowed Julian Date (WJD) | ND,$W_1$ | ND,$W_1$ | ND,$W_1$ | ND,$W_1$ | WJD,I |
| Real Gregorian Date (RGD) | ND,$W_1$ | ND,$W_1$ | ND,$W_1$ | ND,$W_1$ | RGD,I |
| Real Julian Date (RJD) | ND,$W_1$ | ND,$W_1$ | ND,$W_1$ | ND,$W_1$ | RJD,I |
| Non-date (ND) | WGD,I | WJD,I | RGD,I | RJD,I | ND |

The following chart summarizes the types of results that are produced when a year field is part of an addition, and the level of diagnostic message produced when the statement containing the addition is compiled. For the purposes of this chart, the term Non-year includes data items defined without a year CONTENT clause, and literals.

Table 6. Results of Using Year Fields in Addition

| First Operand | Second Operand | | |
|---|---|---|---|
| | WY | RY | NY |
| Windowed Year (WY) | NY,$W_2$ | NY,$W_1$ | WY,I |
| Real Year (RY) | NY,$W_1$ | NY,$W_2$ | RY,I |
| Non-year (NY) | WY,I | RY,I | NY |

A.2 Subtraction

The following chart summarizes the types of results that are produced when a date field is part of a subtraction, and the level of diagnostic message produced when the statement containing the subtraction is compiled. For the purposes of this chart, the term Non-date includes data items defined without a date CONTENT clause, and literals.

Table 7. Results of Using Date Fields in Subtraction

| First Operand | Second Operand | | | | |
|---|---|---|---|---|---|
| | WGD | WJD | RGD | RJD | ND |
| Windowed Gregorian Date (WGD) | ND,I | ND,W | ND,I | ND,W | WGD,I |
| Windowed Julian Date (WJD) | ND,W | ND,I | ND,W | ND,I | WJD,I |
| Real Gregorian Date (RGD) | ND,I | ND,W | ND,I | ND,W | RGD,I |
| Real Julian Date (RJD) | ND,W | ND,I | ND,W | ND,I | RJD,I |
| Non-date (ND) | ND,W | ND,W | ND,W | ND,W | ND |

The following chart summarizes the types of results that are produced when a year field is part of a subtraction, and the level of diagnostic message produced when the statement containing the subtraction is compiled. For the purposes of this chart, the term Non-year includes data items defined without a year CONTENT clause, and literals.

Table 8. Results of Using Year Fields in Subtraction

| First Operand | Second Operand | | |
|---|---|---|---|
| | WY | RY | NY |
| Windowed Year (WY) | NY,I | NY,I | WY,W |
| Real Year (RY) | NY,I | NY,I | RY,W |
| Non-year (NY) | NY,W | NY,W | NY |

A.3 Multiplication

When a date field or year field is an operand in a multiplication, the field is treated as a non-date field (and a warning-level diagnostic message is produced).

A.4 Division

When a date field or year field is an operand in a division, the field is treated as a non-date field (and a warning-level diagnostic message is produced).

A.5 Exponentiation

When a date field or year field is an operand in an exponentiation, the field is treated as a non-date field (and a warning-level diagnostic message is produced).

Extended PL/I DATE Support

The IBM workstation PL/I compiler currently supports a series of date-time patterns (such as 'YYYYMMDD') and a series of built-in functions (such as DAYS and DAYSTODATE) to convert them to and from a count of Lilian days (or seconds). The set of supported date-time patterns is

- YYYYMMDD
- YYYYMMMDD
- YYYYMmmDD
- YYYYDDD
- MMDDYYYY
- MMMDDYYYY
- MmmDDYYYY
- DDMMYYYY
- DDMMMYYYY
- DDMmmYYYY
- DDDYYYY

There are some patterns that occur frequently in user code that are not in this list. These includes patterns containing only a year and a month and those containing only a year. But more important are the patterns with 'YY' year formats.

In order to define how a date with a 'YY' year format is interpreted, a "window" will be defined. This "window" defines the start of a 100-year span to which this 'YY' will be ascribed.

In particular, when converting $y2$ from 'YY' to 'YYYY' with a window w, the returned value $y4$ could be calculated by the following code

```
dcl y4 pic'9999';
dcl cc pic'99';

cc = w/100;

if y2 < mod(w,100) then
  y4 = 100*cc + 100 + y2;
else
  y4 = 100*cc + y2;
```

Similarly, when converting $y4$ from 'YYYY' to 'YY' with a window $w$, the returned value $y2$ could be calculated by the following code Page 2

```
dcl y4 pic'9999';

if y4 < w | y4 >= w+100 then
    signal error;

y2 = mod(y4,100);
```

So, for instance, for the window 1900, '19' is interpreted as '1919', but for the window 1950, '19' is interpreted as '2019'.

Extended DATE built-in functions

The set of supported date-time patterns will now also include the following YY forms of patterns currently supported only with a YYYY form.

- YYMMDD
- YYMMMDD
- YYMmmDD
- YYDDD
- MMDDYY
- MMMDDYY
- MmmDDYY
- DDMMYY
- DDMMMYY
- DDMmmYY
- DDDYY

The set of supported date-time patterns will now also include the following patterns:

- YY
- YYYY
- YYMM
- YYMMM
- YYMmm
- MMYY
- MMMYY
- MmmYY
- YYYYMM
- YYYYMMM
- YYYYMmm
- MMYYYY
- MMMYYYY
- MmmYYYY

Note that when the day is omitted from a pattern it will be assumed to have the value 1, and likewise, if the month and day are both omitted, they are both assumed to have the value 1.

Page 3

The following built-in functions all accept date-time patterns.

- DAYS
- DAYSTODATE
- SECS
- SECSTODATE
- VALIDDATE

All of these built-in functions will now accept an aditional optional argument (in all cases, it would be the final argument) that specifies a window to be used in handling any YY patterns.

So for instance, the DAYS built-in function will now have the syntax:

DAYS( [ d [, p [, w ]]] )

d is a string expression representing a date. If it is omitted,
it is assumed to be the value returned by DATETIME()

p is one of the supported date-time patterns If it is omitted,
it is assumed to be the value 'YYYYMMDDHHMISS999'.

w defines a window to be used to handle any 'YY' year formats.
If it is omitted, a default window is used as described below.

Explicit DATE calculations

The DAYS and DAYSTODATE built-in functions can be used to make date comparisons, conversions and calculations "by-hand".

For example, to compare a 'YYMMDD' date *d1* and a 'YYMMDD' date *d2* using a window *w*, one could simply code DAYS(d1,'YYMMDD',w) < DAYS(d2,'YYMMDD',w)

To convert between a 'YYMMDD' date *d1* and a 'YYYYMMDD' date *d2* using a window *w*, one could perform the somewhat harder assignments d2 = DAYSSTODATE(DAYS(d1,'YYMMDD',w),'YYYYMMDD');
d1 = DAYSSTODATE(DAYS(d2,'YYYYMMDD'),'YYMMDD',w);

However, to subtract 2 'YY' years *y1* and *y2*, one would have to calculate the imposing difference:

DAYSTODATE(DAYS(y1,'YY',w),'YYYY')
- DAYSTODATE(DAYS(y2,'YY',w),'YYYY')

Page 4

To help make some of these operations easier, several new built-in functions will be introduced. More detailed descriptions follow, but in brief:

- REPATTERN(d,p,q,w) := DAYSTODATE( DAYS(d,q,w), p, w )
- Y4DATE(d,w) := DAYSTODATE( DAYS(d,'YYMMDD',w), 'YYYYMMDD' )
- Y4JULIAN(d,w) := DAYSTODATE( DAYS(d,'YYDDD',w), 'YYYYDDD' )
- Y4YEAR(y,w) := DAYSTODATE(DAYS(y,'YY',w),'YYYY')

With these new built-in functions the assignments above become

```
d2 = Y4DATE(d1,w);
d1 = REPATTERN(d2,'YYMMDD','YYYYMMDD',w);
```

And the year difference becomes the much simpler

Y4YEAR(y1,w) - Y4YEAR(y2,w)

Implicit DATE calculations

Implicit date comparisons and conversions will be made by the compiler if the two operands have the new DATE attribute. The new DATE attribute specifies that a variable (or argument or returned value) holds a date with a specified pattern.

It has the syntax

DATE( *<pattern>* )

The *<pattern>* must be one of the supported date patterns.

The DATE attribute is valid only with one of the following attributes

- CHAR(n) NONVARYING
- PIC'(n)9' REAL
- FIXED DEC(n,0) REAL

The length/precision $n$ must match the length of the *<pattern>*.

The DATE built-in function will return a value that has the attribute DATE('YYMMDD'). This allows DATE() to be assigned to a variable with the attribute DATE('YYMMDD') without an error message being generated.

Page 5

However, this also means that if DATE() is assigned to a variable not having the DATE attribute, then an error message would be generated. This should happen only if a compiler option has been specified. The compiler option that will control this is the new RESPECT option. It has the syntax

```
---RESPECT ( ---------------------------------- )
           |                                  |
           +- DATES ---------------------+
                  |                      |
                  |    +- W -+           |
                  |    |     |           |
                  +- ( -+- I -+- ) -+
                       |     |
                       +- E -+
```

The default is RESPECT(). It will cause the compiler to ignore any specification of the DATE attribute and not to apply the DATE attribute to the result of DATE built-in.

The RESPECT( DATES ) option causes the compiler to honor any specification of the DATE attribute and to apply the DATE attribute to the result of DATE built-in. It also controls what messages are issued about the use of the DATE attribute.

Implicit DATE comparisons

The DATE attribute will cause implicit *commoning* when two variables declared with the DATE attribute are compared. Comparisons where only one variable has the DATE attribute will be flagged, and the other comparand will be treated as if had the same DATE attribute; see the Diagnostics section below.

Implicit *commoning* means that the compiler will generate code (most probably invoking a library routine) to convert the dates to a common, comparable representation.

For example, if *d1* and *d2* are declared with the attributes *DATE(p1)* and *DATE(p2)* respectively, then a comparison of them could be performed by comparing *DAYS(d1,p1)* and *DAYS(d2,p2)*.

Note that dates with some patterns (such as YYYYDDD) are comparable as is, but unlike patterns and patterns with two-digit years are not comparable as is.

Note also that these date comparisons may occur in IF and SELECT statements, in WHILE or UNTIL clauses or in the implicit comparison caused by a TO clause.

Finally, if the comparison operator is the equality or inequality operator and the patterns are identical, then the compiler need not generate any special code to do the compare.

Page 6

Implicit DATE assignments

The DATE attribute may also cause implicit conversions to occur in assignments of two variables declared with date patterns. Assignments where only one of the source or target has the date attribute will be flagged; see the Diagnostics section below.

If the source and target have the same DATE attribute, then the assignment proceeds as if neither had the DATE attribute.

If the source and target have differing DATE attributes, then the compiler will generate code (most probably invoking a library routine) to convert the source date before making the assignment.

For example, if *d1* and *d2* are declared with the attributes *DATE(p1)* and *DATE(p2)* respectively, then the assignment of *d2* to *d1* could be performed by assigning *DAYSSTODATE(DAYS(d2,p2,w),p1)* to *d1*.

If the source holds a four-digit year and the target holds a two-digit year, then the source may hold a year not in the target window. In this case, the ERROR condition will be raised.

The DATE attribute will be ignored in assignments and conversions performed in stream i/o statements (such as GET DATA) and in the debugger.

The default window

The window argument may be omitted in the old built-in functions listed above (such as DAYS and DAYSTODATE) and in the new built-in funcstions described below. In these cases, it can be set via the new WINDOW compiler option The *WINDOW* compiler option has the syntax WINDOW( w )

where w is an unsigned integer that represents the start of a fixed window.

The default for the WINDOW option is WINDOW( 1950 ).

New DATE built-in functions

As indicated above, several new built-in functions will be supported in order to make some common usage simpler to code. These built-ins will be described in more detail in this section.

Page 7

REPATTERN built-in function

The new *REPATTERN* built-in function takes a value holding a date in one pattern and returns that value converted to a date in a second pattern.

It has the syntax

REPATTERN( d, p, q [, w ] )

The date value *d* must be computational and will be converted to character if necessary The length of *d* must at least as large as the length of the source pattern *q*. If it is larger, any excess characters must be formed by leading blanks.

The source date pattern *q* and the target date pattern *p* must be among the supported patterns.

*w* must specify an unsigned integer (such as 1950). If *w* is omitted, it defaults to the value specifed in the compiler WINDOW option.

The returned value has the attributes CHAR(m) NONVARYING where *m* is the length of the target pattern *p*.

So, REPATTERN('990101','YYYYMMDD','YYMMDD', 1950) returns '19990101'.

And, REPATTERN('000101','YYYYMMDD','YYMMDD', 1950) returns '20000101'.

While, REPATTERN('19990101','YYMMDD','YYYYMMDD', 1950) returns '990101'.

And, REPATTERN('20000101','YYMMDD','YYYYMMDD', 1950) returns '000101'.

But, REPATTERN('19490101','YYMMDD','YYYYMMDD', 1950) raises ERROR.

Y4DATE built-in function

The new *Y4DATE* built-in function takes a date value with the pattern 'YYMMDD' and returns the date value with the two-digit year widened to a four-digit year.

It has the syntax

Y4DATE( d, [, w ] )

The date value *d* must be computational and will be converted to character if necessary The length of *d* must be at least 6. If it is larger than 6 any excess characters must be formed by leading blanks.

Page 8

*w* must specify an unsigned integer (such as 1950). If *w* is omitted, it defaults to the value specifed in the compiler WINDOW option.

The returned value has the attributes CHAR(8) NONVARYING.

The returned value is calculated as follows:

```
dcl y2 pic'99';
dcl y4 pic'9999';
dcl c  pic'99';

y2 = substr(d,1,2);
cc = w/100;

if y2 < mod(w,100) then
   y4 = 100*cc + 100 + y2;
else
   y4 = 100*cc + y2;

return( y4 || substr(d,3) );
```

So, Y4DATE('990101',1950) returns '19990101'.

But, Y4DATE('000101',1950) returns '20000101'.

Y4JULIAN built-in function

The new *Y4JULIAN* built-in function takes a date value with the pattern 'YYDDD' and returns the date value with the two-digit year widened to a four-digit year.

It has the syntax

Y4JULIAN( d, [, w ] )

The date value *d* must be computational and will be converted to character if necessary The length of *d* must be at least 5. If it is larger than 5 any excess characters must be formed by leading blanks.

*w* must specify an unsigned integer (such as 1950). If *w* is omitted, it defaults to the value specifed in the compiler WINDOW option.

The returned value has the attributes CHAR(7) NONVARYING.

The returned value is calculated as follows:

Page 9

```
dcl y2 pic'99';
dcl y4 pic'9999';
dcl c  pic'99';

y2 = substr(d,1,2);
cc = w/100;

if y2 < mod(w,100) then
  y4 = 100*cc + 100 + y2;
else
  y4 = 100*cc + y2;

return( y4 || substr(d,3) );
```

So, Y4JULIAN('99001',1950) returns '1999001'.

But, Y4JULIAN('00001',1950) returns '2000001'.

Y4YEAR built-in function

The new *Y4YEAR* built-in function takes a date value with the pattern 'YY' and returns the date value with the two-digit year widened to a four-digit year.

It has the syntax

Y4YEAR( d, [, w ] )

The date value *d* must be computational and will be converted to character if necessary The length of *d* must be at least 2. If it is larger than 2 any excess characters must be formed by leading blanks.

*w* must specify an unsigned integer (such as 1950). If *w* is omitted, it defaults to the value specifed in the compiler WINDOW option.

The returned value has the attributes CHAR(4) NONVARYING.

The returned value is calculated as follows:

```
dcl y2 pic'99';
dcl y4 pic'9999';
dcl c  pic'99';

y2 = d;
cc = w/100;
```

Page 10

```
if y2 < mod(w,100) then
    y4 = 100*cc + 100 + y2;
else
    y4 = 100*cc + y2;

return( y4 );
```

So, Y4YEAR('99',1950) returns '1999'.

But, Y4YEAR('00',1950) returns '2000'.

Diagnostics

In PL/I, *effective* assignments occur when

- an expression is passed as an argument to an entry that has descibed that argument
- an expression is used in a RETURN statement The following uses of date variables will be flagged with an E-level message:

- Assignment (explicit or effective) of
    o a date to a non-date
    o a non-date to a date
- Any arithmetic operation applied to a date
- Use of a date in a BY clause (since this implies a comparison with 0)
- Use of a date in any mathematical built-in function
- Use of a date in any arithmetic built-in functions including MAX and MIN
- Use of a date in the precision-handling built-in functions ADD, DIVIDE, MULTIPLY and SUBTRACT In all the cases above where diagnostics are produced, code will still be produced but no windowing will occur. Effectively, the DATE attribute will be ignored.

However, in a comparison of a date with a non-date, windowing will occur. The non-date will be treated as if it had the same DATE attribute as the date comparand. An E-level message will still be produced in this case.

Thus, in a comparison of a variable having the DATE('YYMMDD') attribute with the literal '851003', '851003' will be treated as if it had the DATE('YYMMDD') attribute with the same window as the variable.

SQL support

The SQL preprocessor will object to this new DATE attribute. However, if the compiler accepted /*/ as a comment, then the user could enclose the DATE attribute between /*/ and /*/ and the SQL preprocessor would ignore it (as part of a comment that stretched from the first /* to the last */.

Under the new LAXCOMMENT suboption of the RULES compiler option, the compiler will accept /*/ as a comment (but no preprocessor will).

The default for this suboption of RULES is NOLAXCOMMENT. It will cause the compiler to treat /*/ as it has previously, i.e. as an unclosed comment.

What is claimed is:

1. A method of processing a computer source program, comprising the steps of:
    (a) receiving a plurality of programming language statements comprising a source program into a memory of a computer, wherein at least one of the received statements comprises a data declaration extension requesting a Year 2000 solution comprising a windowing technique, wherein said step of receiving comprises storing the modified data declaration statement in the memory of the computer;
    (b) identifying data declaration statements relating to year values in date fields of the source program;
    (c) modifying at least one identified data declaration statement to add an extension requesting a windowing technique and defining a window within which the year value associated with the statement is specified, wherein said window within which the year value is specified is from 1900 to 1999; and
    (d) compiling the source program into an object program in the memory of the computer, wherein the object program includes instructions for processing and/or invoking procedures on a data field associated with the extended data declaration according to the windowing technique requested in the data declaration.

2. A method of processing a computer source program, comprising the steps of:
    (a) receiving a plurality of programming language statements comprising a source program into a memory of a computer, wherein at least one of the received statements comprises a data declaration extension requesting a Year 2000 solution comprising a windowing technique, wherein said step of receiving comprises storing the modified data declaration statement in the memory of the computer;
    (b) identifying data declaration statements relating to year values in date fields of the source program;
    (c) modifying at least one identified data declaration statement to add an extension requesting a windowing technique and defining a window within which the year value associated with the statement is specified;
    (d) adding a default window attribute to the source program, for defining a default window for at least one identified data declaration statement for which no window is defined in said modifying step, wherein said default window attribute comprises: YEARWINDOW (x), wherein x is a base year value and wherein said range is defined as all years within 100 years from the base year x; and
    (e) compiling the source program into an object program in the memory of the computer, wherein the object program includes instructions for processing and/or invoking procedures on a data field associated with the extended data declaration according to the windowing technique requested in the data declaration.

3. A method of processing a computer source program, comprising the steps of:
    (a) receiving a plurality of programming language statements comprising a source program into a memory of a computer, wherein at least one of the received statements comprises a data declaration extension requesting a Year 2000 solution comprising a windowing technique, wherein said step of receiving comprises storing the modified data declaration statement in the memory of the computer;
    (b) identifying data declaration statements relating to year values in date fields of the source program;
    (c) modifying at least one identified data declaration statement to add an extension requesting a windowing technique and defining a window within which the year value associated with the statement is specified;
    (d) adding a compiler directive to the source program for requesting that all window extensions added to data declaration statements be treated as comments upon running the object program to have no effect on the run-time behavior of the object program, wherein said compiler directive for requesting that all window extensions added to data declaration statements be treated as comments, comprises: NOYEARWINDOW; and
    (e) compiling the source program into an object program in the memory of the computer, wherein the object program includes instructions for processing and/or invoking procedures on a data field associated with the extended data declaration according to the windowing technique requested in the data declaration.

4. A method of processing a computer source program, comprising the steps of:
    (a) receiving a plurality of programming language statements comprising a source program into a memory of a computer, wherein at least one of the received statements comprises a data declaration extension requesting a Year 2000 solution comprising a windowing technique, and wherein said step of receiving comprises storing the modified data declaration statement in the memory of the computer;
    (b) identifying data declaration statements relating to year values in date fields of the source program;
    (c) modifying at least one identified data declaration statement to add an extension requesting a windowing technique and defining a window within which the year value associated with the statement is specified, wherein said step of modifying at least one identified data declaration statement comprises the steps of:
        (i) defining a date field format in at least one identified data declaration statement; and
        (ii) adding a window attribute to the at least one identified data declaration statement, defining said window, wherein said step of adding a window attribute comprises the step of defining a fixed range of years within which the year value associated with the at least one statement is specified, wherein said window attribute comprises WINDOW (x,y), wherein x is a year value represting the lower end of the fixed range and y is a year value representing the upper end of the fixed range; and
    (d) compiling the source program into an object program in the memory of the computer, wherein the object program includes instructions for processing and/or invoking procedures on a data field associated with the extended data declaration according to the windowing technique requested in the data declaration.

5. A method of processing a computer source program, comprising the steps of:
    (a) receiving a plurality of programming language statements comprising a source program into a memory of a computer, wherein at least one of the received statements comprises a data declaration extension requesting a Year 2000 solution comprising a windowing technique, and wherein said step of receiving comprises storing the modified data declaration statement in the memory of the computer;

(b) identifying data declaration statements relating to year values in date fields of the source program;

(c) modifying at least one identified data declaration statement to add an extension requesting a windowing technique and defining a window within which the year value associated with the statement is specified, wherein said step of modifying at least one identified data declaration statement comprises the steps of:

(i) defining a date field format in at least one identified data declaration statement; and (ii) adding a window attribute to the at least one identified data declaration statement, defining said window, wherein said step of adding a window attribute comprises the step of defining a fixed range of years within which the year value associated with the at least one statement is specified, wehrein said window attribute comprises: WINDOW (x), wherein x is a base year value and wherein said range is defined as all years within 100 years from the base year x; and (d) compiling the source program into an object program in the memory of the computer, wherein the object program includes instructions for processing and/or invoking procedures on a data field associated with the extended data declaration according to the windowing technique requested in the data declaration.

6. A computer programming apparatus, comprising:

(a) a computer having a memory;

(b) means, performed by the computer, for receiving a series of programming language statements comprising a source program into a memory of the computer, wherein at least one of the received statements comprises a data declaration extension requesting a Year 2000 solution comprising a windowing technique, wherein said receiving means comprises means, performed by the computer, for storing the modified data declaration statement int he memory of the computer;

(c) means, performed with the computer, for identifying data declaration statements relating to year values in date fields of the source program;

(d) means, performed with the computer, for modifying at least one identified data declaration statement to add an extension requesting a windowing technique and defining a window within which the year value associated with the statement is specified, wherein said means for modifying at least one identified data declaration statement comprises:

(i) means, performed by the computer, for defining a date field format in at least one identified data declaration statement; and (ii) means, performed by the computer, for adding a window attribute to the at least one identified data declaration statement, defining said window, wherein said means for adding a window attribute comprises means, performed by the computer, for defining a fixed range of years within which the year value associated with the at least one statement is specified, wherein said window attribute comprises: WINDOW (x,y), wherein x is a year value representing the lower end of the fixed range and year is a year value representing the upper end of the fixed range; and (e) means, performed by the computer, for compiling the source program into an object program in the memory of the computer, wherein the object program includes instructions for processing and/or invoking the procedures on a data field associated with the extended data declaration according to the windowing technique requested in the declaration.

7. A computer programming apparatus, comprising:

(a) a computer having a memory;

(b) means, performed by the computer, for receiving a series of programming language statements comprising a source program into a memory of the computer, wherein at least one of the received statements comprises a data declaration extension requesting a Year 2000 solution comprising a windowing technique, wherein said receiving means comprises means, performed by the computer, for storing the modified data declaration statement in the memory of the computer;

(c) means, performed with the computer, for identifying data declaration statements relating to year values in date fields of the source program;

(d) means, performed with the computer, for modifying at least one identified data declaration statement to add an extension requesting a windowing technique and defining a window within which the year value associated with the statement is specified, wherein said means for modifying at least one identified data declaration statement comprises:

(i) means, performed by the computer, for defining a date field format in at least one identified data declaration statement; and (ii) means, performed by the computer, for adding a window attribute to the at least one identified data declaration statement, defining said window, wherein said means for adding a window attribute comprises means, performed by the computer, for defining a fixed range of years within which the year value associated with the at least one statement is specified, wherein said window attribute comprises: WINDOW (x), wherein x is a base year value and wherein said range is defined as all years within 100 years from the base year x; and (e) means, performed by the computer, for compiling the source program into an object program in the memory of the computer, wherein the object program includes instructions for processing and/or invoking the procedures on a data field associated with the extended data declaration according to the windowing technique requested in the declaration.

* * * * *